(12) United States Patent
Sullivan et al.

(10) Patent No.: US 11,347,697 B1
(45) Date of Patent: May 31, 2022

(54) PROACTIVELY OPTIMIZING A STORAGE SYSTEM

(71) Applicant: PURE STORAGE, INC., Mountain View, CA (US)

(72) Inventors: Scott Sullivan, Alamo, CA (US); Benjamin Borowiec, San Jose, CA (US); Danbing Zhu, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 129 days.

(21) Appl. No.: 16/828,164

(22) Filed: Mar. 24, 2020

Related U.S. Application Data

(63) Continuation-in-part of application No. 16/210,487, filed on Dec. 5, 2018, now Pat. No. 11,030,160, (Continued)

(51) Int. Cl.
  *G06F 16/182* (2019.01)
  *G06F 3/06* (2006.01)
  *G06F 16/951* (2019.01)

(52) U.S. Cl.
  CPC ........ *G06F 16/1824* (2019.01); *G06F 3/0605* (2013.01); *G06F 3/067* (2013.01); (Continued)

(58) Field of Classification Search
  CPC .. G06F 16/1824; G06F 16/951; G06F 3/0631; G06F 3/067; G06F 3/0685; (Continued)

(56) References Cited

U.S. PATENT DOCUMENTS

| 5,706,210 A | 1/1998 | Kumano et al. |
| 5,799,200 A | 8/1998 | Brant et al. |

(Continued)

FOREIGN PATENT DOCUMENTS

| EP | 0725324 A2 | 8/1996 |
| WO | 2012087648 A2 | 6/2012 |

(Continued)

OTHER PUBLICATIONS

Costa, Lauro B., et al., "Towards Automating the Configuration of a Distributed Storage System", GRID 2010, Brussels, Belgium, Oct. 25-28, 2010, pp. 201-208.*

(Continued)

*Primary Examiner* — Robert Stevens
(74) *Attorney, Agent, or Firm* — ALG Intellectual Property, LLC

(57) ABSTRACT

Proactively optimizing a storage system, including: generating, at a storage system services provider, a list of problem storage systems among a group of storage systems monitored by the storage system services provider; selecting a problem storage system from the list of problem storage systems based on two or more criteria; determining a system update for the selected problem storage system to address a problem with the selected problem storage system; and applying the system update to the selected problem storage system.

20 Claims, 13 Drawing Sheets

Related U.S. Application Data which is a continuation of application No. 14/969,465, filed on Dec. 15, 2015, now Pat. No. 10,162,835.

(52) U.S. Cl.
CPC .......... *G06F 3/0629* (2013.01); *G06F 3/0631* (2013.01); *G06F 3/0685* (2013.01); *G06F 3/0688* (2013.01); *G06F 3/0689* (2013.01); *G06F 16/951* (2019.01)

(58) Field of Classification Search
CPC .... G06F 3/0688; G06F 3/0629; G06F 3/0605; G06F 3/0689
USPC .......................................................... 707/634
See application file for complete search history.

(56) References Cited

U.S. PATENT DOCUMENTS

| | | |
|---|---|---|
| 5,933,598 A | 8/1999 | Scales et al. |
| 6,012,032 A | 1/2000 | Donovan et al. |
| 6,085,333 A | 7/2000 | Dekoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,200,887 B2 | 6/2012 | Bennett |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,081,713 B1 | 7/2015 | Bennett |
| 9,124,569 B2 | 9/2015 | Hussain et al. |
| 9,134,922 B1 | 9/2015 | Rajagopal et al. |
| 9,189,334 B2 | 11/2015 | Bennett |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,311,182 B2 | 4/2016 | Bennett |
| 9,444,822 B1 | 9/2016 | Borowiec et al. |
| 9,507,532 B1 | 11/2016 | Colgrove et al. |
| 9,632,870 B2 | 4/2017 | Bennett |
| 9,773,026 B1 * | 9/2017 | Tetreault ................. G06F 11/30 |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison et al. |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |

(56) References Cited

U.S. PATENT DOCUMENTS

| | | |
|---|---|---|
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0378888 A1 | 12/2015 | Zhang et al. |
| 2016/0098323 A1 | 4/2016 | Mutha et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2017/0123889 A1* | 5/2017 | Haridas .............. G06F 16/21 |

FOREIGN PATENT DOCUMENTS

| | | |
|---|---|---|
| WO | 2013071087 A1 | 5/2013 |
| WO | 2014110137 A1 | 7/2014 |
| WO | 2016015008 A1 | 1/2016 |
| WO | 2016190938 A1 | 12/2016 |
| WO | 2016195759 A1 | 12/2016 |
| WO | 2016195958 A1 | 12/2016 |
| WO | 2016195961 A1 | 12/2016 |

OTHER PUBLICATIONS

Hsu, Chin-Jung, et al., "Inside-Out: Reliable Performance Prediction for Distributed Storage Systems in the Cloud", SRDS 2016, Budapest, Hungary, Sep. 26-29, 2016, pp. 127-136.*

Bellamy-McIntyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

ETSI, "Network Function Virtualisation (NFV); Resiliency Requirements", ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Google Search of "storage array define" performed by the Examiner on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Apr. 29, 2016, 12 pages.

International Search Report and Written Opinion, PCT/US2016/015008, dated May 4, 2016, 12 pages.

International Search Report and Written Opinion, PCT/US2016/016333, dated Jun. 8, 2016, 12 pages.

International Search Report and Written Opinion, PCT/US2016/020410, dated Jul. 8, 2016, 17 pages.

International Search Report and Written Opinion, PCT/US2016/032052, dated Aug. 30, 2016, 17 pages.

International Search Report and Written Opinion, PCT/US2016/032084, dated Jul. 18, 2016, 12 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

Kong, "Using PCI Express as the Primary System Interconnect in Multiroot Compute, Storage, Communications and Embedded Systems", White Paper, IDT.com (online), Aug. 28, 2008, 12 pages, URL: www.idt.com/document/whp/idt-pcie-multi-root-white-paper.

Li et al., "Access Control for the Services Oriented Architecture", Proceedings of the 2007 ACM Workshop on Secure Web Services (SWS '07), Nov. 2007, pp. 9-17, ACM New York, NY.

Microsoft, "Hybrid for SharePoint Server 2013—Security Reference Architecture", Microsoft (online), Oct. 2014, 53 pages, URL: hybrid.office.com/img/Security_Reference_Architecture.pdf.

Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Microsoft, "Hybrid Identity", Microsoft (online), Apr. 2014, 36 pages, URL: www.aka.ms/HybridIdentityWp.

PCMAG, "Storage Array Definition", Published May 10, 2013, URL: http://web.archive.org/web/20130510121646/http://www.pcmag.com/encyclopedia/term/52091/storage-array, 2 pages.

Storer et al., "Secure Data Deduplication", Proceedings of the 4th ACM International Workshop on Storage Security and Survivability (StorageSS'08), Oct. 2008, 10 pages, ACM New York, NY. USA, DOI: 10.1145/1456469.1456471.

Sweere, "Creating Storage Class Persistent Memory with NVDIMM", Published in Aug. 2013, Flash Memory Summit 2013, URL: http://ww.flashmemorysummit.com/English/Collaterals/Proceedings/2013/20130814_T2_Sweere.pdf, 22 pages.

Techopedia, "What is a disk array", techopedia.com (online), Jan. 13, 2012, 1 page, URL: web.archive.org/web/20120113053358/http://www.techopedia.com/definition/1009/disk-array.

Webopedia, "What is a disk array", webopedia.com (online), May 26, 2011, 2 pages, URL: web/archive.org/web/20110526081214/http://www.webopedia.com/TERM/D/disk_array.html.

Wikipedia, "Convergent Encryption", Wikipedia.org (online), accessed Sep. 8, 2015, 2 pages, URL: en.wikipedia.org/wiki/Convergent_encryption.

Faith, et al., dictzip file format, github.com (online), accessed Oct. 22, 2021, URL: github.com/fidlej/idzip, 37 pages.

* cited by examiner

PROACTIVELY OPTIMIZING A STORAGE SYSTEM

CROSS-REFERENCE TO RELATED APPLICATIONS

This application is a continuation-in-part application of and claims priority from U.S. patent application Ser. No. 16/210,487, filed Dec. 5, 2018, which is a continuation of and claims priority from U.S. Pat. No. 10,162,835, issued Dec. 25, 2018.

SUMMARY OF THE INVENTION

Methods, apparatuses, and systems for proactively optimizing a storage system, including: generating, at a storage system services provider, a list of problem storage systems among a group of storage systems monitored by the storage system services provider; selecting a problem storage system from the list of problem storage systems based on two or more criteria; determining a system update for the selected problem storage system to address a problem with the selected problem storage system; and applying the system update to the selected problem storage system.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
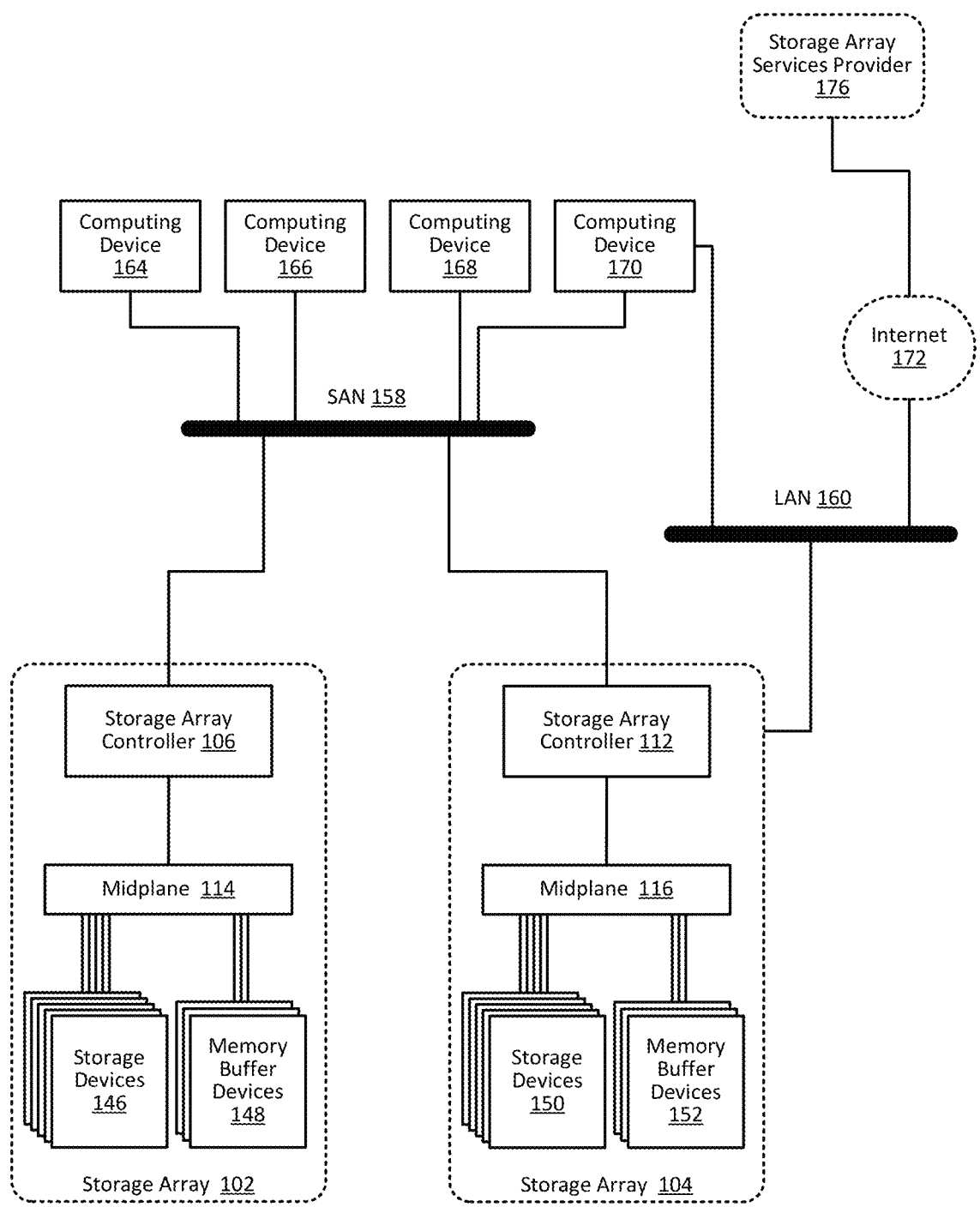
FIG. 1 sets forth a block diagram of a multi-array system in which storage arrays are proactively managed according to embodiments of the present disclosure.

Example methods, apparatus, and products for proactive management of a plurality of storage arrays in a multi-array system in accordance with the present disclosure are described with reference to the accompanying drawings, beginning with FIG. 1. FIG. 1 sets forth a block diagram of a multi-array system in which storage arrays are proactively managed according to embodiments of the present disclosure. The system of FIG. 1 includes a number of computing devices (164, 166, 168, 170). The computing devices (164, 166, 168, 170) depicted in FIG. 1 may be implemented in a number of different ways. For example, the computing devices (164, 166, 168, 170) depicted in FIG. 1 may be embodied as a server in a data center, a workstation, a personal computer, a notebook, or the like.

The computing devices (164, 166, 168, 170) in the example of FIG. 1 are coupled for data communications to a number of storage arrays (102, 104) through a storage area network (SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP') and others as will occur to those of skill in the art.

The example storage arrays (102, 104) of FIG. 1 provide persistent data storage for the computing devices (164, 166, 168, 170). The example storage arrays (102, 104) of FIG. 1 may provide persistent data storage for the computing devices (164, 166, 168, 170), at least in part, through the use of a plurality of storage devices (146, 150). A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114) to a number of storage devices (146, 150). Readers will appreciate that although the example depicted in FIG. 1 includes an embodiment where the storage array controller (106, 112) is communicatively coupled the storage devices (146, 150) via a midplane (114), other forms of interconnects may be utilized to facilitate communications between the storage array controller (106, 112) and the storage devices (146, 150).

In addition to being coupled to the computing devices through the SAN (158), the storage arrays (102, 104) may also be coupled to the computing devices through the LAN (160) and to one or more cloud service providers through the Internet (172). The term 'cloud' as used in this specification refers to systems and computing environments that provide services to user devices through the sharing of computing resources through a network. Generally, the user device is unaware of the exact computing resources utilized by the cloud system to provide the services. Although in many cases such 'cloud' environments or systems are accessible via the Internet, readers of skill in the art will recognize that any system that abstracts the use of shared resources to provide services to a user through any network may be considered a cloud-based system.

One example cloud service in FIG. 1 is a storage array services provider (176). The storage array service provider (176) may be configured to provide various storage array services such as reporting of storage array performance characteristics, configuration control of the storage arrays, and the like. The storage array services provider may rely on modules executing on the storage array itself to gather or process such data.

The system of FIG. 1 may be configured, according to embodiments of the present disclosure, to proactively manage a plurality of storage arrays in a multi-array system. The plurality of storage arrays in the multi-array system may be proactively managed by the storage array services provider (176) comparing one or more conditions of a particular storage array to conditions of other storage arrays in the multi-array system. The conditions of a storage array can represent various operational aspects of the storage array. The conditions of the storage array can include, for example, the amount of input/output operations per second ('IOPS') being serviced by a storage array, an amount of data reduction being achieved by a storage array through the use of data compression and data deduplication, and so on. Comparing one or more conditions of a particular storage array to conditions of other storage arrays in the multi-array system may be carried out by directly or indirectly receiving information describing one or more conditions from each of the storage arrays in the multi-array system. In such an example, the information describing one or more conditions of each of the storage arrays in the multi-array system may be compared to determine which storage arrays are underperforming with respect to a particular condition, which storage arrays performing well with respect to a particular condition, and so on.

The plurality of storage arrays in the multi-array system may be further proactively managed by the storage array services provider (176) generating an action recommendation based on the comparison. The action recommendation can specify one or more actions for improving the conditions of the particular storage array relative to the conditions of the other storage arrays. Such actions can include, for example, installing one or more software modules, updating one or more software modules, installing one or more hardware modules, updating one or more hardware modules, changing one or more configuration parameters, and so on.

An action recommendation may be generated based on the comparison of one or more conditions of a particular storage array to conditions of other storage arrays in the multi-array system. For example, if a comparison reveals that a particular condition of a particular storage array is worse than the same condition of other storage arrays, the particular storage array and the other storage arrays may be examined to identify differences between the storage arrays that may cause the disparity between the conditions of the storage arrays.

Consider an example in which comparing one or more conditions of a particular storage array to conditions of other storage arrays in the multi-array system reveals that the particular storage array is servicing fewer IOPS than the other storage arrays in the multi-array system. In such an example, the particular storage array and the other storage arrays may be compared by receiving information describing computer hardware installed in each storage array, information describing computer software installed in each storage array, information describing configuration settings of each storage array, and so on. Such information may be compared to identify differences between the storage arrays that may be the cause of the disparity between the conditions of the storage arrays.

In alternative embodiments, certain actions may be associated with improving certain conditions. For example, an action of updating the firmware installed on a storage array controller in a particular storage array may be associated with increasing the number of IOPS that can be serviced by the storage array. As such, if a comparison reveals that a particular condition of a particular storage array is worse than the same condition of other storage arrays, one or more actions that are associated with improving the particular condition may be recommended.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Proactively managing a plurality of storage arrays in a multi-array system in accordance with embodiments of the present disclosure is generally implemented with computers. In the system of FIG. 1, for example, all the computing devices (164-170), storage controllers (106, 112), and storage array services provider (176) may be implemented, to some extent at least, as computers. For further explanation, therefore, FIG. 2 sets forth a block diagram of several example computers useful for proactively managing a plurality of storage arrays in a multi-array system according to embodiments of the present disclosure. The example computers in FIG. 2 include a storage array services provider (176).

Figure 2:
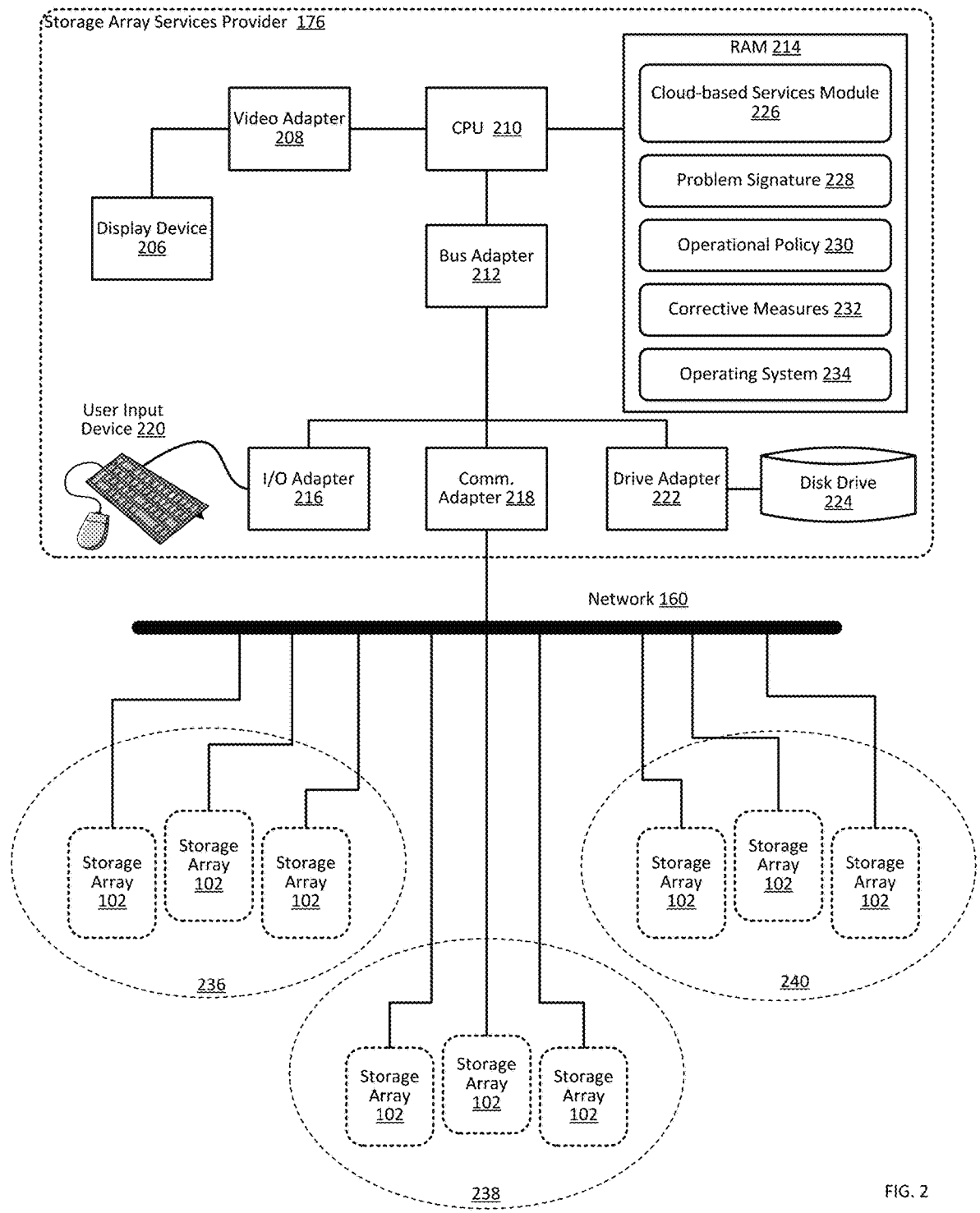
FIG. 2 sets forth a block diagram of several example computers useful for proactively managing a plurality of storage arrays in a multi-array system according to embodiments of the present disclosure.

The storage array services provider (176) of FIG. 2 includes at least one computer processor (210) or 'CPU' as well as random access memory (214) (RAM') which is connected through a high speed memory bus and bus adapter (212) to processor (210) and to other components of the storage array services provider (176). Stored in RAM (214) is a cloud-based services module (226), a module of computer program instructions that when executed causes the storage array services provider (176) to proactively manage a plurality of storage arrays in a multi-array system. The cloud-based services module (226) may be configured for comparing one or more conditions of a particular storage array to conditions of other storage arrays in the multi-array system and generating an action recommendation based on the comparison, as described in greater detail below.

Also stored in RAM (214) of the example storage array services provider (176) is an operating system (234). Examples of operating systems useful in computers configured for proactively managing a plurality of storage arrays in a multi-array system according to embodiments of the present disclosure include UNIX™, Linux™, Microsoft Windows™, and others as will occur to those of skill in the art. The operating system (234) and the cloud-based storage array services module (226) in the example of FIG. 2 are shown in RAM (168), but many components of such software typically are stored in non-volatile memory also, such as, for example, on a disk drive (224). Likewise, the modules depicted in RAM (238, 240) of the storage array (102) and client-side user computer (204) may be stored in non-volatile memory.

The storage array services provider (176) of FIG. 2 also includes disk drive adapter (222) coupled through an expansion bus and bus adapter (212) to the processor (210) and other components of the storage array services provider (176). Disk drive adapter (222) connects non-volatile data storage to the storage array services provider (176) in the form of disk drive (224). Disk drive adapters may be implemented in a variety of ways including as SATA (Serial Advanced Technology Attachment) adapters, PATA (Parallel ATA) adapters, Integrated Drive Electronics (IDE') adapters, Small Computer System Interface (SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example storage array services provider (176) of FIG. 2 includes one or more input/output ('I/O') adapters (216). I/O adapters implement user-oriented input/output through, for example, software drivers and computer hardware for controlling output to display devices such as computer display screens, as well as user input from user input devices (220) such as keyboards and mice. The example storage array services provider (176) of FIG. 2 also includes a video adapter (208), which is an example of an I/O adapter specially designed for graphic output to a display device (206) such as a display screen or computer monitor. Video adapter (208) is connected to the processor (210) through a high speed video bus.

The example storage array services provider (176) of FIG. 2 includes a communications adapter (218) for data communications with the storage arrays (102) through the network (160). Such data communications may be carried out through data communications networks such as IP data communications networks, and in other ways as will occur to those of skill in the art. Communications adapters implement the hardware level of data communications through which one computer sends data communications to another computer, directly or through a data communications network. Examples of such communications adapters useful include modems for wired dial-up communications, Ethernet (IEEE 802.3) adapters for wired data communications, and 802.11 adapters for wireless data communications.

Readers of skill in the art will recognize that the components of the storage array services provider (176) as depicted in FIG. 2 are example computing components only. Such a storage array services provider (176) may be configured in various ways including, for example, as a server. Such a server may not include the I/O adapters, the driver adapters, display devices, video adapters and the like.

Figure 3:
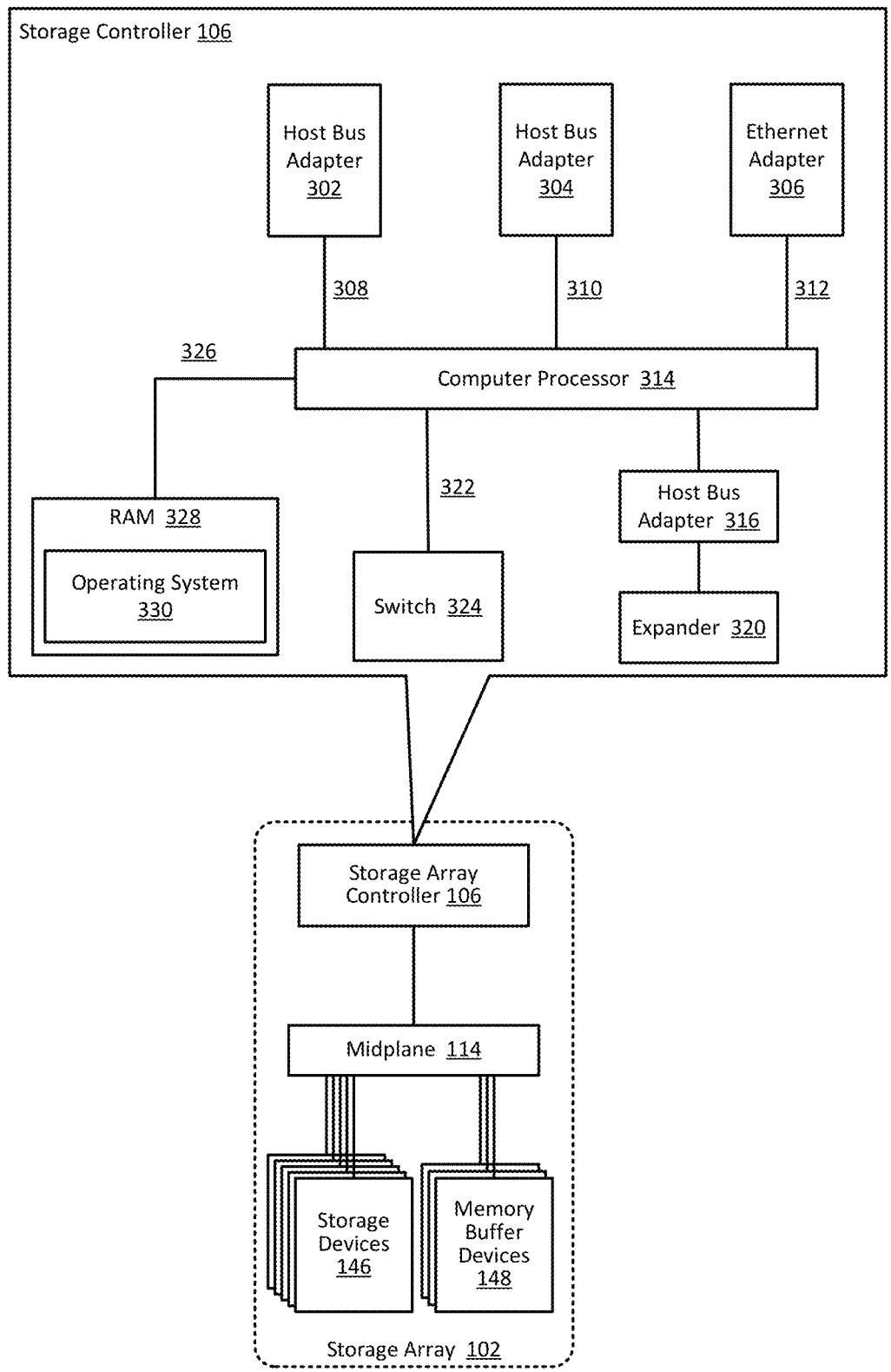
FIG. 3 sets forth a block diagram of a storage array controller useful in proactively managing storage arrays in a multi-array system update according to embodiments of the present disclosure.

As mentioned above, a storage array (102) may also be implemented, at least to some extent, as a computer. For further explanation, therefore, FIG. 3 sets forth a block diagram of a storage array controller (106) useful in proactively managing storage arrays in a multi-array system update according to embodiments of the present disclosure. The storage array controller (106) of FIG. 3 is similar to the storage array controllers depicted in FIG. 1, as the storage array controller (106) of FIG. 3 is communicatively coupled, via a midplane (114), to one or more storage devices (146) and to one or more memory buffer devices (148) that are included as part of a storage array (102). The storage array controller (106) may be coupled to the midplane (114) via one or more data communications links and the midplane (114) may be coupled to the storage devices (146) and the memory buffer devices (148) via one or more data communications links. Such data communications links may be embodied, for example, as Peripheral Component Interconnect Express ('PCIe') bus.

The storage array controller (106) of FIG. 3 includes at least one computer processor (314) or 'CPU' as well as random access memory ('RAM') (328). The computer processor (314) may be connected to the RAM (328) via a data communications link (326), which may be embodied as a high speed memory bus such as a Double-Data Rate 4 ('DDR4') bus or other memory bus.

Stored in RAM (328) is an operating system (330). Examples of operating systems useful in storage array controllers (106) according to embodiments of the present disclosure include UNIX™, Linux™, Microsoft Windows™, and others as will occur to those of skill in the art. Readers will appreciate that while the operating system (330) in the example of FIG. 3 is shown in RAM (328), many components of such software may also be stored in non-volatile memory such as, for example, on a disk drive, on a solid-state drive, and so on.

The storage array controller (106) of FIG. 3 also includes a plurality of host bus adapters (302, 304, 306) that are coupled to the processor (314) via a data communications link (308, 310, 312). Each host bus adapter (302, 304, 306) may be embodied as a module of computer hardware that connects the host system (i.e., the storage array controller) to other network and storage devices. Each of the host bus adapters (302, 304, 306) of FIG. 3 may be embodied, for example, as a Fibre Channel adapter that enables the storage array controller (106) to connect to a SAN, as an Ethernet adapter that enables the storage array controller (106) to connect to a LAN, and so on. Each of the host bus adapters (302, 304, 306) may be coupled to the computer processor (314) via a data communications link (308, 310, 312) such as, for example, a PCIe bus.

The storage array controller (106) of FIG. 3 also includes a host bus adapter (316) that is coupled to an expander (320). The expander (320) depicted in FIG. 3 may be embodied as a module of computer hardware utilized to attach a host system to a larger number of storage devices than would be possible without the expander (320). The expander (320) depicted in FIG. 3 may be embodied, for example, as a SAS expander utilized to enable the host bus adapter (316) to attach to storage devices in an embodiment where the host bus adapter (316) is embodied as a SAS controller.

The storage array controller (106) of FIG. 3 also includes a switch (324) that is coupled to the computer processor (314) via a data communications link (322). The switch (324) of FIG. 3 may be embodied as a computer hardware device that can create multiple endpoints out of a single endpoint, thereby enabling multiple devices to share what was initially a single endpoint. The switch (324) of FIG. 3 may be embodied, for example, as a PCIe switch that is coupled to a PCIe bus and presents multiple PCIe connection points to the midplane (114).

The storage array controller (106) of FIG. 3 can also include a data communications link for coupling the storage array controller (106) to other storage array controllers. Such a data communications link may be embodied, for example, as a QuickPath Interconnect ('QPI') interconnect, as PCIe non-transparent bridge ('NTB') interconnect, and so on. Readers will recognize that the components, protocols, adapters, and architectures described above are for illustration only, not limitation. Such a storage array controller may be implemented in a variety of different ways, each of which is well within the scope of the present disclosure.

Figure 4:
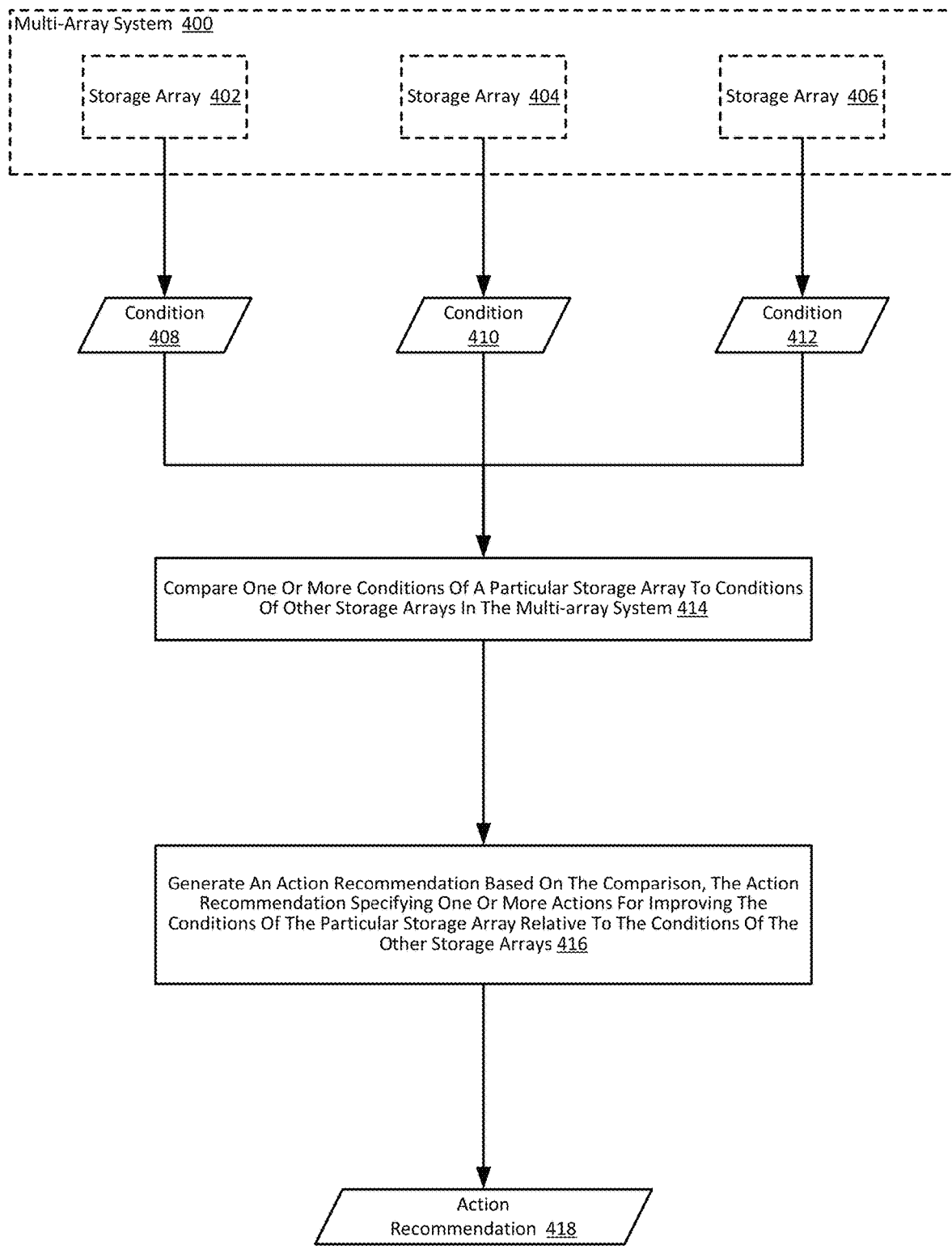
FIG. 4 sets forth a flow chart illustrating an example method for proactive management of a plurality of storage arrays in a multi-array system according to embodiments of the present disclosure.

For further explanation, FIG. 4 sets forth a flow chart illustrating an example method for proactive management of a plurality of storage arrays (402, 404, 406) in a multi-array system (400) according to embodiments of the present disclosure. Each of the storage arrays (402, 404, 406) in FIG. 4 may include one or more storage devices and one or more controllers as described above and depicted in FIGS. 1-3. The storage arrays (402, 404, 406) may collectively form a multi-array system (400), where the storage arrays (402, 404, 406) may even be physically located in distinct locations such as, for example, different cities or different countries.

The example method depicted in FIG. 4 includes comparing (414) one or more conditions (408) of a particular storage array (402) to conditions (410, 412) of other storage arrays (404, 406) in the multi-array system (400). The conditions (408, 410, 412) depicted in FIG. 4 can represent various operational aspects of a storage array. The conditions (408, 410, 412) of a storage array (402, 404, 406) can include, for example, the amount of IOPS being serviced by a storage array (402, 404, 406), an amount of data reduction being achieved by a storage array (402, 404, 406) through the use of data compression and data deduplication, and so on.

In the example method depicted in FIG. 4, comparing (414) one or more conditions (408) of a particular storage array (402) to conditions (410, 412) of other storage arrays (404, 406) in the multi-array system (400) may be carried out by directly or indirectly receiving information describing one or more conditions (408, 410, 412) from each of the storage arrays (402, 404, 406) in the multi-array system (400). In such an example, the information describing one or more conditions (408, 410, 412) of each of the storage arrays (402, 404, 406) in the multi-array system (400) may be compared (414) to determine which storage arrays are underperforming with respect to a particular condition, which storage arrays performing well with respect to a particular condition, and so on.

The example method depicted in FIG. 4 also includes generating (416) an action recommendation (418) based on the comparison. The action recommendation (418) of FIG. 4 can specify one or more actions for improving the conditions (408) of the particular storage array (402) relative to the conditions (410, 412) of the other storage arrays (404, 406). Such actions can include, for example, installing one or more software modules, updating one or more software modules, installing one or more hardware modules, updating one or more hardware modules, changing one or more configuration parameters, and so on.

In the example method of FIG. 4, an action recommendation (418) may be generated (416) based on the comparison of one or more conditions (408) of a particular storage array (402) to conditions (410, 412) of other storage arrays (404, 406) in the multi-array system (400). For example, if a comparison reveals that a particular condition (408) of a particular storage array (402) is worse than the same condition (410, 412) of other storage arrays (404, 406), the particular storage array (402) and the other storage arrays (404, 406) may be examined to identify differences between the storage arrays (402, 404, 406) that may cause the disparity between the condition (408, 410, 412) of the storage arrays (402, 404, 406).

Consider an example in which comparing (414) one or more conditions (408) of a particular storage array (402) to conditions (410, 412) of other storage arrays (404, 406) in the multi-array system (400) reveals that the particular storage array (402) is servicing fewer IOPS than the other storage arrays (404, 406) in the multi-array system (400). In such an example, the particular storage array (402) and the other storage arrays (404, 406) may be compared by receiving information describing computer hardware installed in each storage array (402, 404, 406), information describing computer software installed in each storage array (402, 404, 406), information describing configuration settings of each storage array (402, 404, 406), and so on. Such information may be compared to identify differences between the storage arrays (402, 404, 406) that may be the cause of the disparity between the condition (408, 410, 412) of the storage arrays (402, 404, 406).

In alternative embodiments, certain actions may be associated with improving certain conditions. For example, an action of updating the firmware installed on a storage array controller in a particular storage array may be associated with increasing the number of IOPS that can be serviced by the storage array. As such, if a comparison reveals that a particular condition (408) of a particular storage array (402) is worse than the same condition (410, 412) of other storage arrays (404, 406), one or more actions that are associated with improving the particular condition may be recommended.

Figure 5:
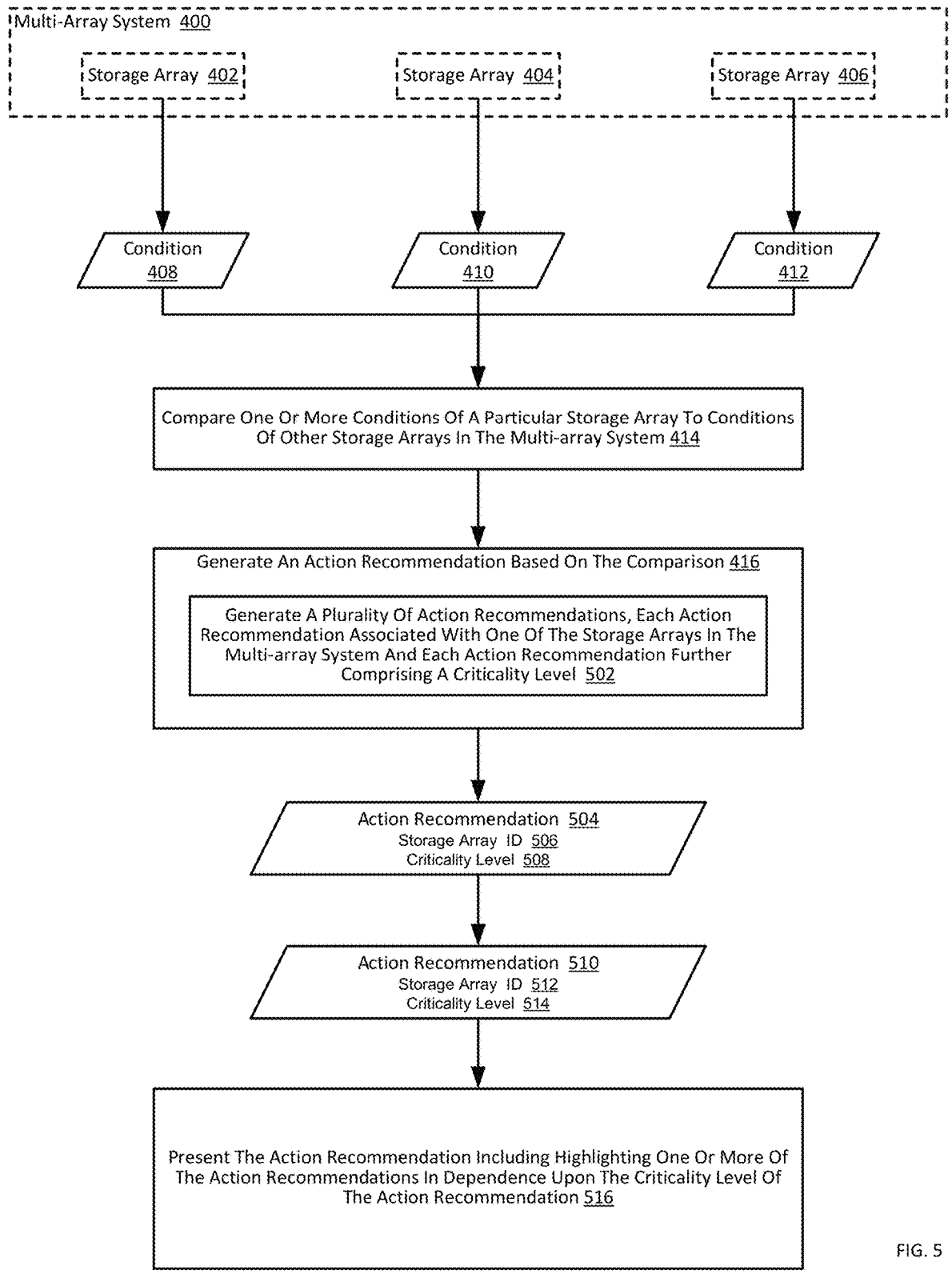
FIG. 5 sets forth a flow chart illustrating an example method for proactive management of a plurality of storage arrays in a multi-array system according to embodiments of the present disclosure.

For further explanation, FIG. 5 sets forth a flow chart illustrating an additional example method for proactive management of a plurality of storage arrays (402, 404, 406) in a multi-array system (400) according to embodiments of the present disclosure. The example method depicted in FIG. 5 is similar to the example method depicted in FIG. 4, as the example method depicted in FIG. 5 also includes comparing (414) one or more conditions (408) of a particular storage array (402) to conditions (410, 412) of other storage arrays (404, 406) in the multi-array system (400) and generating (416) an action recommendation based on the comparison.

In the example method depicted in FIG. 5, generating (416) an action recommendation can include generating (502) a plurality of action recommendations (504, 510). Although only two action recommendations (504, 510) are depicted in FIG. 5, readers will appreciate that more action recommendations may also be generated. In the example method depicted in FIG. 5, each action recommendation (504, 510) is associated with one of the storage arrays (402, 404, 406) in the multi-array system (400) and each action recommendation (504, 510) includes criticality level (508, 514). Each action recommendation (504, 510) may be associated with one of the storage arrays (402, 404, 406), for example, by including a storage array identifier (506, 512) in the action recommendation (504, 510). In such an example, the storage array identifier (506, 512) may be embodied as a number, text string, or other identifier that identifies the storage array that the action described in the recommendation (504, 510) will be performed on should the user or other appropriate actor choose to accept the action recommendation (504, 510).

In the example method depicted in FIG. 5, each action recommendation (504, 510) also includes a criticality level (508, 514). The criticality level (508, 514) may be embodied as a value (e.g., 1, 2, 3), as a text string (e.g., low, medium, high), or in any other form that can be used to convey how important a particular action is to apply. Such a criticality level (508, 514) may be determined, for example, based on the nature of the problem to be resolved by applying a particular action. For example, action recommendations (504, 510) that are associated with actions designed to improve the stability of a particular storage array may have a criticality level that is higher than action recommendations (504, 510) that are associated with actions designed to improve storage utilization of a particular storage array.

The example method depicted in FIG. 5 also includes presenting (516) the action recommendations (504, 510). Presenting (516) the action recommendations (504, 510) may be carried out, for example, through the use of a graphical user interface (GUI') that is displayed on a computing device such as a personal computer, laptop computer, tablet computer, smartphone, and so on. Such a GUI may be embodied, for example, as a standalone GUI, as an interface presented in a web browser, and so on.

In the example method depicted in FIG. 5, presenting (516) the action recommendations (504, 510) can include highlighting one or more of the action recommendations (504, 510) in dependence upon the criticality level (508, 514) of the action recommendation (504, 510). Highlighting one or more of the action recommendations (504, 510) in dependence upon the criticality level (508, 514) of the action recommendation (504, 510) may be carried out, for example, by highlighting only the action recommendations (504, 510) whose criticality level (508, 514) are within a predetermined range of values, by highlighting only a predetermined number of action recommendations (504, 510) whose criticality levels (508, 514) are the most critical, by highlighting only a predetermined percentage of action recommendations (504, 510) whose criticality levels (508, 514) are the most critical, and so on. In the example method depicted in FIG. 5, highlighting one or more of the action recommendations (504, 510) may be carried out, for example, by utilizing a special background to display the action recommendation (504, 510) upon, by utilizing a special font to display the action recommendation (504, 510), and so on. As such, highlighting one or more of the action recommendations (504, 510) may accomplish the effect of visually distinguishing the highlighted action recommendations (504, 510) from less critical action recommendations.

Figure 6:
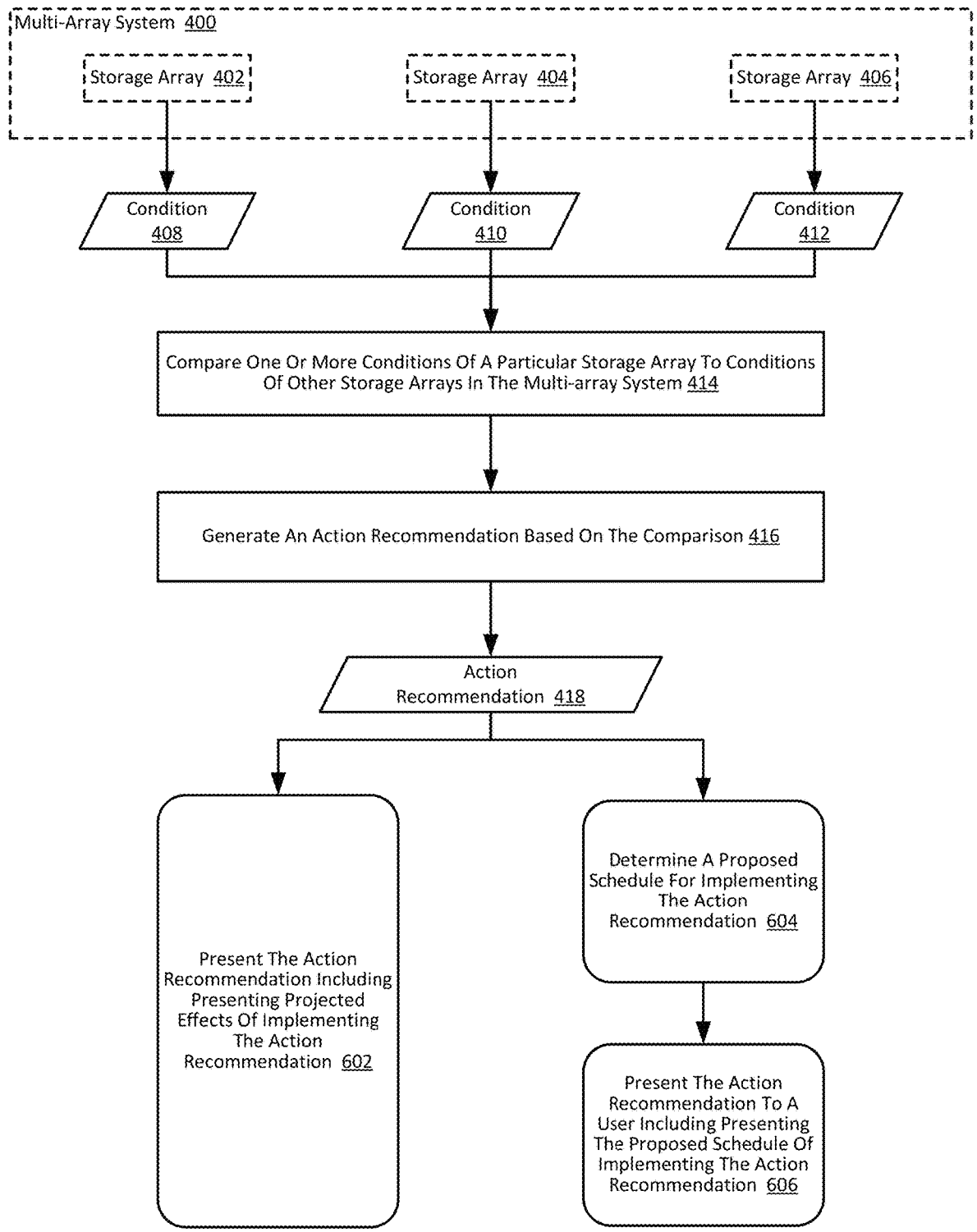
FIG. 6 sets forth a flow chart illustrating an example method for proactive management of a plurality of storage arrays in a multi-array system according to embodiments of the present disclosure.

For further explanation, FIG. 6 sets forth a flow chart illustrating an additional example method for proactive management of a plurality of storage arrays (402, 404, 406) in a multi-array system (400) according to embodiments of the present disclosure. The example method depicted in FIG. 6 is similar to the example method depicted in FIG. 4, as the example method depicted in FIG. 6 also includes comparing (414) one or more conditions (408) of a particular storage array (402) to conditions (410, 412) of other storage arrays (404, 406) in the multi-array system (400) and generating (416) an action recommendation based on the comparison.

The example method depicted in FIG. 6 also includes presenting (602) the action recommendation (418) including presenting projected effects of implementing the action recommendation (418). The projected effects of implementing the action recommendation (418) can represent the impact on the one of more conditions (408, 410, 412) of a storage array (408, 410, 412) that are projected to occur if the action recommendation (418) is implemented. The projected effects of implementing the action recommendation (418) can be expressed, for example, as information describing the projected number of IOPS that a storage array (408, 410, 412) is projected to be able to service if the action recommendation (418) is implemented, as information describing the projected data reduction level that a storage array (408, 410, 412) is projected to be able to achieve if the action recommendation (418) is implemented, as information describing the amount of downtime that a storage array (408, 410, 412) is projected to experience if the action recommendation (418) is implemented, and so on. In such a way, the projected impact of implementing the action recommendation (418) can be presented to a decision maker (e.g., a user, a system administrator, a system management module) to enable the decision maker to determine whether to implement the action recommendation (418).

The example method depicted in FIG. 6 also includes determining (604) a proposed schedule for implementing the action recommendation (418). Determining (604) a proposed schedule for implementing the action recommendation (418) may be carried out, for example, by determining the amount of processing resources (e.g., bandwidth, processor cycles, memory) that are needed to implement the action recommendation (418) and determining the amount of processing resources that are expected to be available during various periods of time. In such a way, when the amount of processing resources that are needed to implement the action recommendation (418) are relatively high, a proposed schedule may be determined (604) such that the action recommendation (418) is implemented at times during which the amount of processing resources that are expected to be available are relatively high. Alternatively, when the amount of processing resources that are needed to implement the action recommendation (418) are relatively low, a proposed schedule may be determined (604) such that the action recommendation (418) is implemented relatively soon.

The example method depicted in FIG. 6 also includes presenting (606) the action recommendation (418) to a user including presenting the proposed schedule for implementing the action recommendation (418). The proposed schedule for implementing the action recommendation (418) can include, for example, information describing the time at which the process of implementing the action recommendation (418) will begin, information describing the time at which the process of implementing the action recommendation (418) will terminate, information describing systems or resources that will be unavailable during the process of implementing the action recommendation (418), and so on. In such an example, the proposed schedule for implementing the action recommendation (418) may be presented (606) to a user through the use of a standalone application that is executing on a device (e.g., laptop computer, tablet computer, smartphone) that is associated with the user. Alternatively, the proposed schedule for implementing the action recommendation (418) may be presented (606) to a user through the use of a web portal that is accessed via a browser that is executing on a device that is accessed by the user. Readers will appreciate that additional mechanisms are contemplated for presenting the proposed schedule for implementing the action recommendation (418), all of which are within the scope of the present disclosure.

Figure 7:
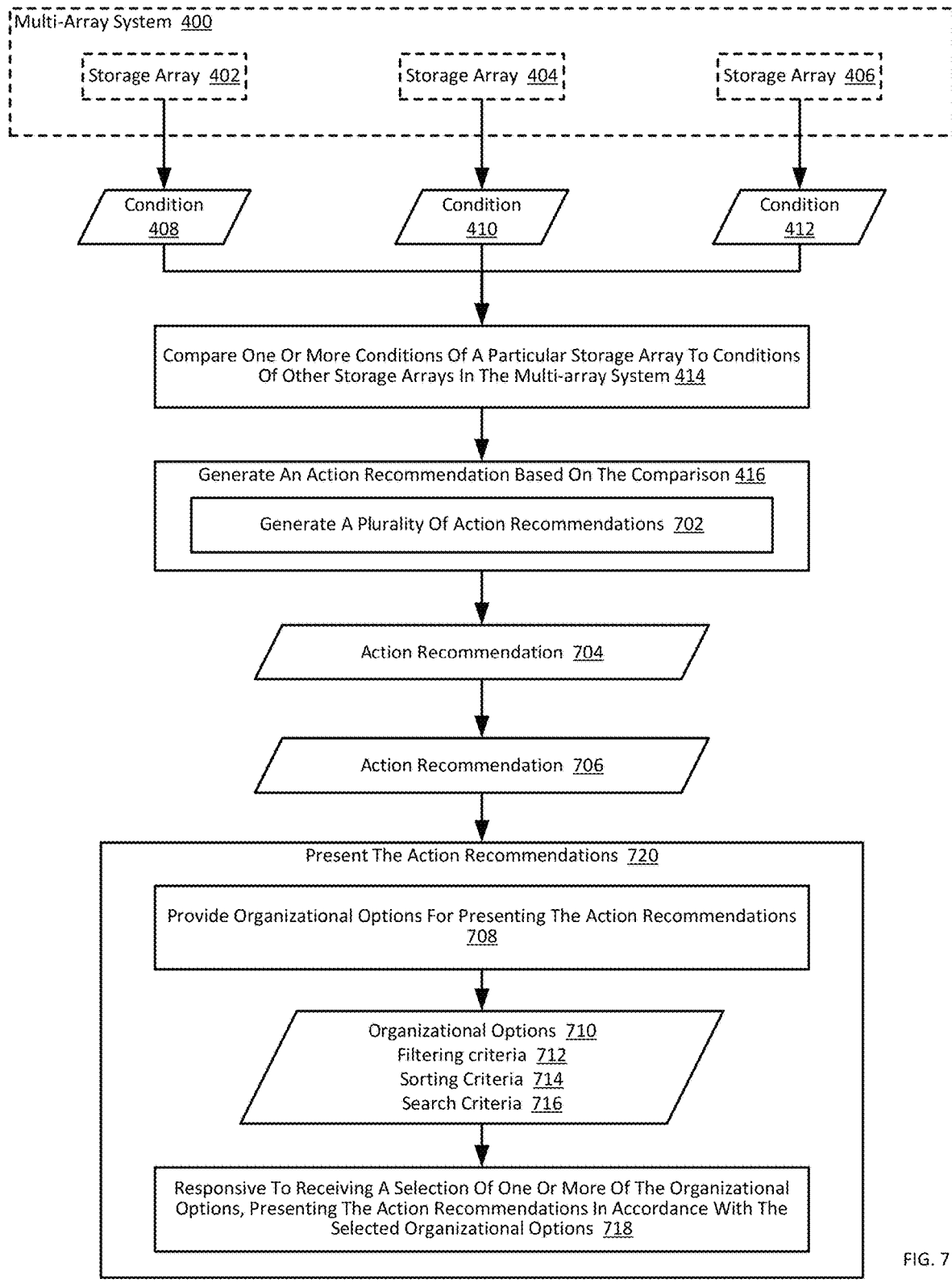
FIG. 7 sets forth a flow chart illustrating an example method for proactive management of a plurality of storage arrays in a multi-array system according to embodiments of the present disclosure.

For further explanation, FIG. 7 sets forth a flow chart illustrating an additional example method for proactive management of a plurality of storage arrays (402, 404, 406) in a multi-array system (400) according to embodiments of the present disclosure. The example method depicted in FIG. 7 is similar to the example method depicted in FIG. 4, as the example method depicted in FIG. 7 also includes comparing (414) one or more conditions (408) of a particular storage array (402) to conditions (410, 412) of other storage arrays (404, 406) in the multi-array system (400) and generating (416) an action recommendation based on the comparison.

In the example method depicted in FIG. 7, generating (416) an action recommendation based on the comparison can include generating (702) a plurality of action recommendations (704, 706). Readers will appreciate that each of the plurality of action recommendations (704, 706) may be generated (702) to each address a different condition, each of the plurality of action recommendations (704, 706) may be generated (702) as alternatives intended to address a the same condition, or any combination thereof.

The example method depicted in FIG. 7 also includes presenting (720) the action recommendations (704, 706). The action recommendations (704, 706) may be presented (720), for example, through the use of a dedicated GUI executing on a computing device such as a laptop computer, tablet computer, smartphone, and so on. Alternatively, the action recommendations (704, 706) may be presented (720) via a web browser or similar application for retrieving, presenting, and traversing information resources over a data communications network. By presenting (720) the action recommendations (704, 706) to an authorized user, the user may elect to implement a particular action recommendation (704, 706) or elect to decline the implementation of a particular action recommendation (704, 706).

In the example method depicted in FIG. 7, presenting (720) the action recommendations (704, 706) can include providing (708) organizational options (710) for presenting the action recommendations (704, 706). The organizational options (710) can include, for example, one or more filtering criteria (712), one or more sorting criteria (714), or one or more search criteria (716). Such organizational options (710) may be utilized to control which action recommendations (704, 706) are presented to a user, to control the order in which one or more action recommendations (704, 706) are presented to a user, or otherwise attempt to organize the presentation of the action recommendations (704, 706) in a way that is more beneficial to the user.

The example method depicted in FIG. 7 can include presenting (718) the action recommendations (704, 706) in accordance with the selected organizational options. Presenting (718) the action recommendations (704, 706) in accordance with the selected organizational options may be carried out in response to receiving a selection of one or more of the organizational options. Presenting (718) the action recommendations (704, 706) in accordance with the selected organizational options may be carried out, for example, by sorting action recommendations (704, 706) in accordance with a sorting policy associated with the selected organizational options, by excluding action recommendations (704, 706) that are not in compliance with filtering criteria associated with the selected organizational options, and so on.

Figure 8:
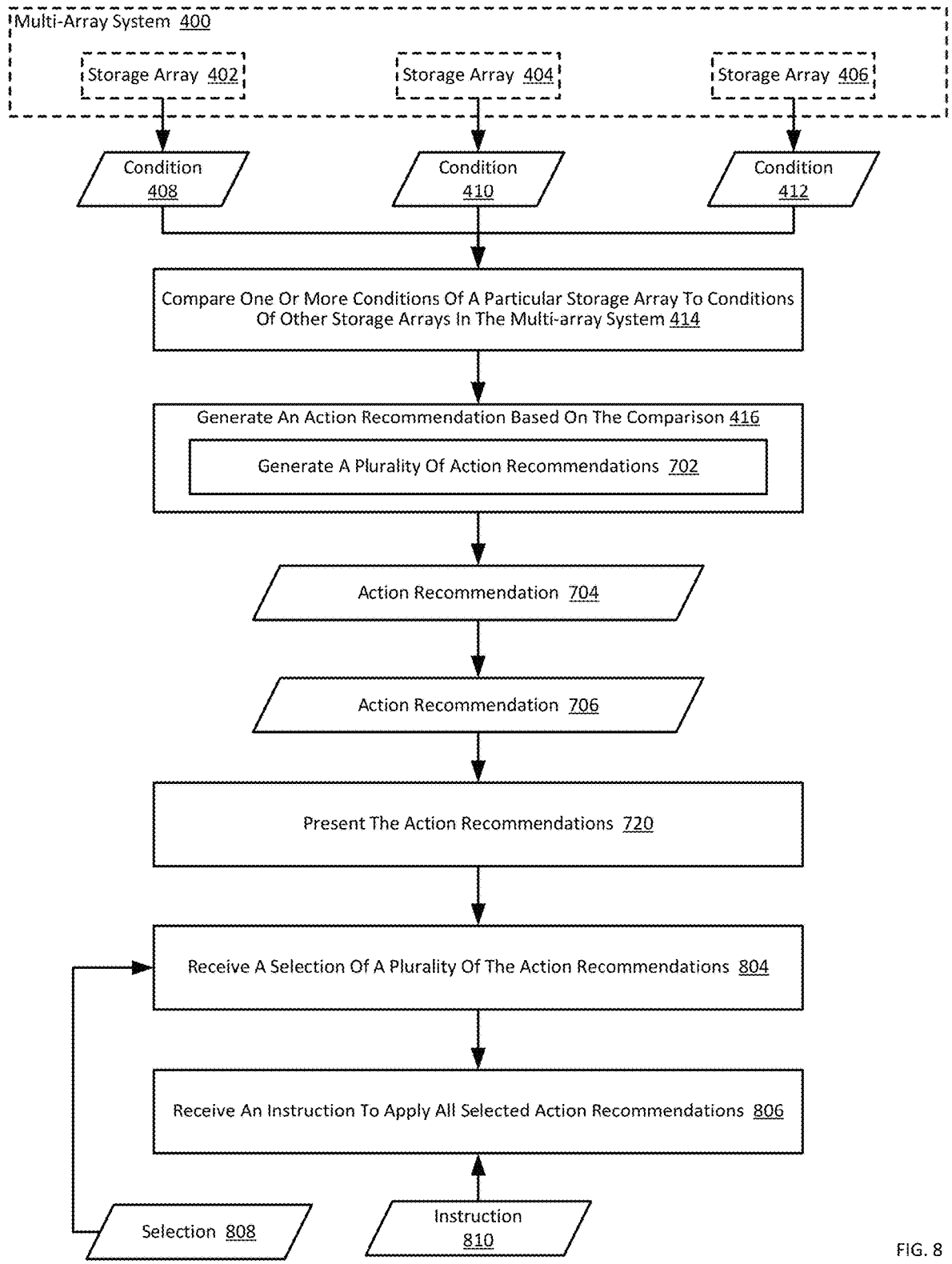
FIG. 8 sets forth a flow chart illustrating an example method for proactive management of a plurality of storage arrays in a multi-array system according to embodiments of the present disclosure.

For further explanation, FIG. 8 sets forth a flow chart illustrating an additional example method for proactive management of a plurality of storage arrays (402, 404, 406) in a multi-array system (400) according to embodiments of the present disclosure. The example method depicted in FIG. 8 is similar to the example method depicted in FIG. 4, as the example method depicted in FIG. 8 also includes comparing (414) one or more conditions (408) of a particular storage array (402) to conditions (410, 412) of other storage arrays (404, 406) in the multi-array system (400) and generating (416) an action recommendation based on the comparison. The example method depicted in FIG. 8 is also similar to the example method depicted in FIG. 7, as the example method depicted in FIG. 8 also includes generating (702) a plurality of action recommendations (704, 706) and presenting (720) the action recommendations (704, 706).

The example method depicted in FIG. 8 also includes receiving (804) a selection (808) of a plurality of the action recommendations (704, 706). The selection (808) of the plurality of the action recommendations (704, 706) may be received (804), for example, via a user interface that presents the action recommendations (704, 706) to a user. Such a user interface may include graphical elements such as buttons, selection boxes, or other elements that enable a user to select which action recommendations (704, 706) they would like to have implemented.

The example method depicted in FIG. 8 also includes receiving (806) an instruction (810) to apply all selected action recommendations (704, 706). The instruction (810) to apply all selected action recommendations (704, 706) may be received (806), for example, via a user interface that presents the action recommendations (704, 706) to a user. Such a user interface may include graphical elements such as buttons, selection boxes, or other elements that enable a user to issue an instruction (810) to apply all action recommendations (704, 706) that the user has selected.

Figure 9:
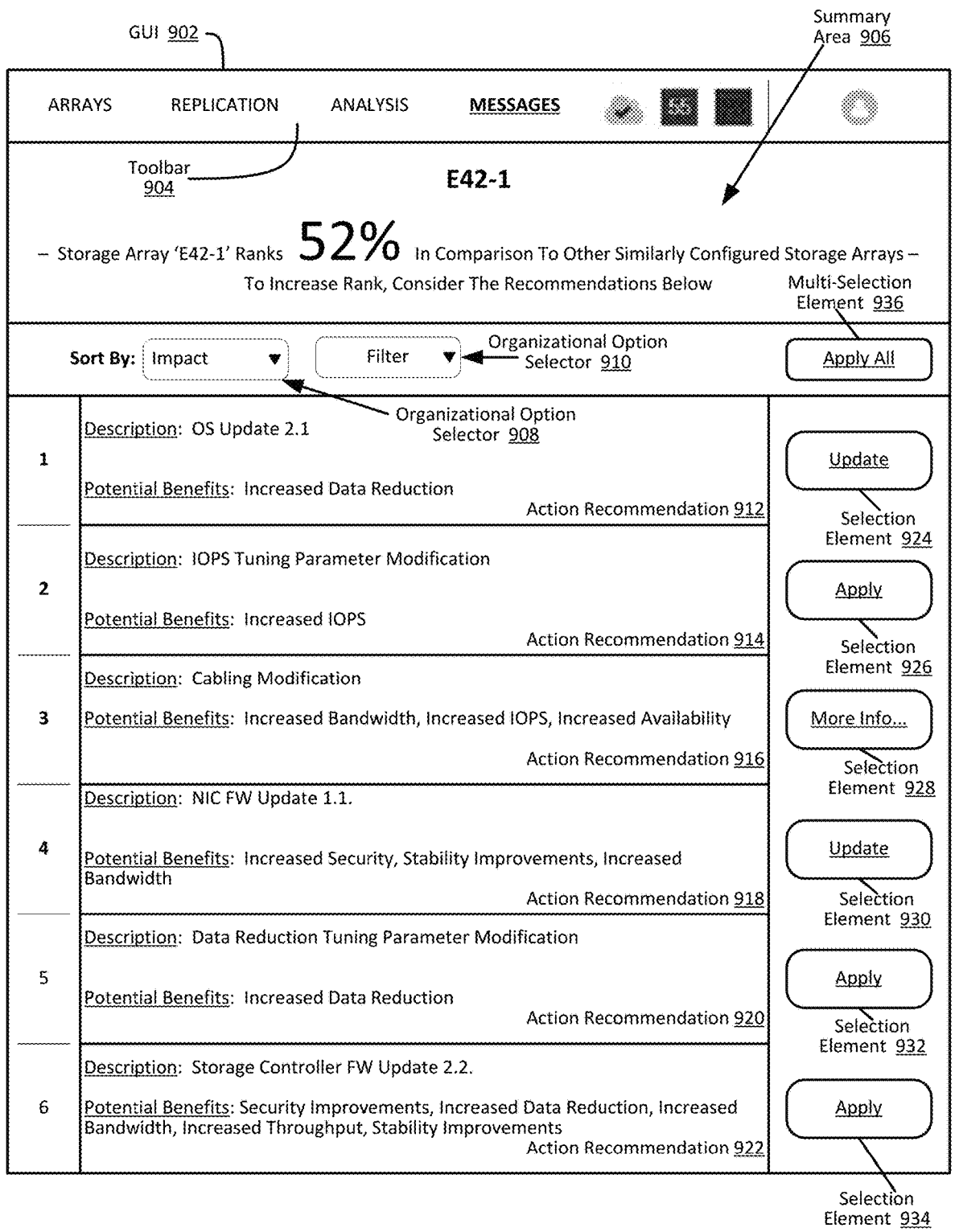
FIG. 9 sets forth a GUI useful in proactive managing a plurality of storage arrays in a multi-array system according to embodiments of the present disclosure.

For further explanation, FIG. 9 sets forth a GUI (902) useful in proactive managing a plurality of storage arrays in a multi-array system according to embodiments of the present disclosure. The GUI (902) depicted in FIG. 9 includes a toolbar (904) that can contain drop down menus useful in selecting the particular content that is to be displayed in the GUI (902). The GUI (902) depicted in FIG. 9 also includes one or more informational icons that may be used to visually convey information such as, for example, what percentage of total storage in the array has been used.

The GUI (902) depicted in FIG. 9 also includes a summary area (906). The summary area (906) may be embodied as a portion of the GUI (902) that is reserved for proving a quick summary of how well a particular storage array is operating. Such a summary area (906) may include an identification of the storage array whose performance is being summarized. In the specific example of FIG. 9, the storage array whose performance is being summarized is identified as being "E42-1." The performance of a particular storage array may be summarized in the summary area (906) in absolute terms or relative terms such as, for example, how well the particular storage array is performing relative to other storage arrays in the multi-array system. How well the particular storage array is performing relative to other storage arrays in the multi-array system may be calculated, for example, using a predetermined function that takes into account various performance metrics (e.g., IOPS provided, data reduction levels achieved, percentage of requests serviced without error) using a weighted or unweighted scoring system.

The GUI (902) depicted in FIG. 9 also includes multiple organizational option selectors (908, 910). The organizational option selectors (908, 910) represent graphical elements that enable a user to select one or more of the organizational options described above with reference to FIG. 7. Such organizational options can include, for example, one or more filtering criteria, one or more sorting criteria, or one or more search criteria. Such organizational options may be utilized to control which action recommendations are presented to a user, to control the order in which one or more action recommendations are presented to a user, or otherwise attempt to organize the presentation of the action recommendations in a way that is more beneficial to the user.

The GUI (902) depicted in FIG. 9 also includes six action recommendations (912, 914, 916, 918, 920, 922). Each of the action recommendations (912, 914, 916, 918, 920, 922) depicted in FIG. 9 include a general description of the recommended action to be performed as well as a description of the potential benefits to obtained by implementing the recommended action. Readers will appreciate that although six action recommendations (912, 914, 916, 918, 920, 922) are depicted in FIG. 9, the depiction of six action recommendations (912, 914, 916, 918, 920, 922) in no way represents a limitation of embodiments of the present invention.

The GUI (902) depicted in FIG. 9 also includes six selection elements (924, 926, 928, 930, 932, 934), each associated with a single action recommendation (912, 914, 916, 918, 920, 922), that are utilized to select a particular recommended action for implementation. As illustrated in FIG. 9, such selection elements (924, 926, 928, 930, 932, 934) can not only be utilized to select a particular recommended action for implementation, but such selection elements (924, 926, 928, 930, 932, 934) may in some cases be utilized to display more information about a particular action. Although each recommended action is associated with its own selection element (924, 926, 928, 930, 932, 934) that may be utilized to select a particular action recommendation (912, 914, 916, 918, 920, 922) for implementation, the GUI (902) depicted in FIG. 9 also includes a single multi-selection element (936) that can be utilized to apply all recommended actions.

Figure 10:
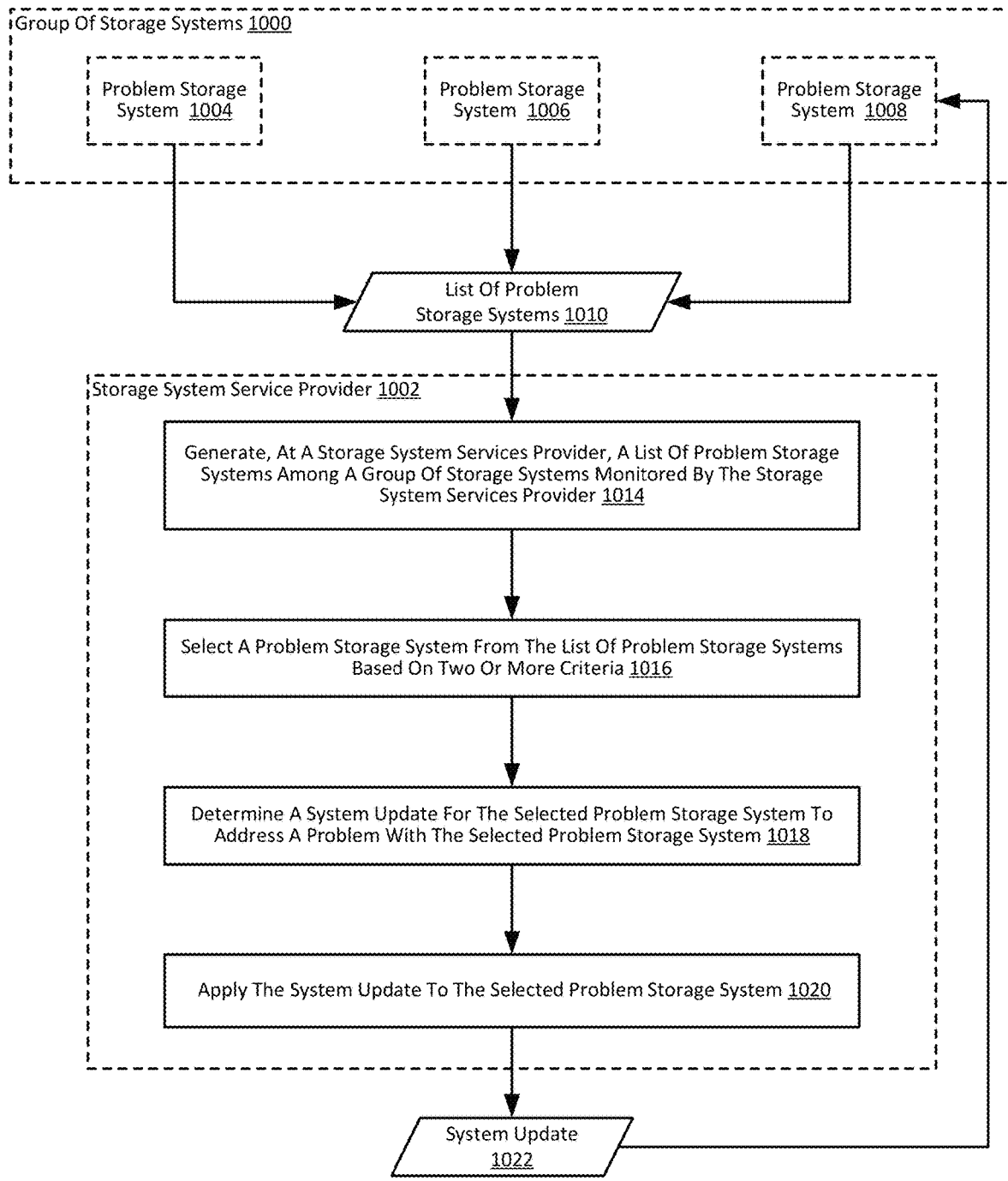
FIG. 10 sets forth a flow chart illustrating an example method for proactively optimizing a storage system according to embodiments of the present disclosure.

For further explanation, FIG. 10 sets forth a flow chart illustrating an example method for proactively optimizing a storage system according to embodiments of the present disclosure. The example method depicted in FIG. 10 includes generating (1014), at a storage system services provider (1002), a list of problem storage systems (1010) among a group of storage systems (1000) monitored by the storage system services provider (1002). A storage system is collection of devices used to store data. Storage systems include storage arrays and multi-array systems. Each storage system in the group of storage systems (1000) is under the control of an organization, and one organization may control multiple storage systems in the group of storage systems (1000). An organization refers to an entity primarily in control of the storage system or to which a storage system belongs. The group of storage systems (1000) may include all or a subset of storage systems monitored by the storage system services provider (1002).

The storage system services provider (1002) is a computer system or group of computer systems that monitors the group of storage systems (1000). Specifically, the storage system services provider (1002) may receive error reports for errors encountered on storage systems within different organizations. An error report, or reported error, refers to a malfunction of the storage system either sent automatically from the storage system to the storage system services provider (1002) or created by a user of the storage system and sent to the storage system services provider (1002). The storage system services provider (1002) may also automatically attempt to resolve reported errors or groups of reported errors (e.g., indicating a larger issue) by applying a system update to the problem storage system (1004, 1006, 1008).

A problem storage system (1004, 1006, 1008) is a storage system for which at least one error report has been received by the storage system service provider (1002). The list of problem storage systems (1010) may be a collection of entries each describing an error reported for a storage system. Specifically, the list of problem storage systems (1010) may include entries for each error reported, and multiple entries may refer to the same problem storage system (1004, 1006, 1008). Each entry in the list of problem storage systems (1010) may include various information about a reported error including, for example, error type, time of error report, storage system ID, software version, firmware version, hours in operation, and current system status.

Generating (1014), at a storage system services provider (1002), a list of problem storage systems (1010) among a group of storage systems (1000) monitored by the storage system services provider (1002) may be carried out by the storage system services provider (1002) collecting reported errors, organizing the reported errors, and prioritizing some reported errors or groups of errors over others. Generating (1014) the list of problem storage systems (1010) may also include deriving different trends from the reported errors. The storage system services provider (1002) may use the error reports to determine whether errors are increasing or decreasing over time, or otherwise fit a known pattern of error reports that indicate a known or previously encountered problem with the storage system.

The method of FIG. 10 further includes selecting (1016) a problem storage system (1008) from the list of problem storage systems (1010) based on two or more criteria. Selecting (1016) a problem storage system (1008) from the list of problem storage systems (1010) based on two or more criteria may be carried out by the storage system services provider (1002) filtering the list of problem storage systems (1010) based on the criteria and selecting the problem storage system (1008) that matches all or most criteria. Examples of criteria may include organization to which the problem storage system belongs, type of storage system, number of total storage systems belonging to the organization, age of storage system, total number of errors reported, types of errors reported, number of errors at or above a particular severity, and whether the number of reported errors is increasing.

The method of FIG. 10 further includes determining (1018) a system update (1022) for the selected problem storage system (1008) to address a problem with the selected problem storage system (1008). A system update (1022) is software, firmware, or both that upgrades the current software or firmware on the storage system. Determining (1018) a system update (1022) for the selected problem storage system (1008) to address a problem with the selected problem storage system (1008) may be carried out by determining the current version of software and firmware on the selected problem storage system (1008) and selecting a target version of software and/or firmware to address the reported errors for the selected problem storage system (1008). Once a target version of software and/or firmware is selected, the storage system service provider (1002) may then determine an upgrade path to apply the compatible upgrades to the current version of the software and firmware on the selected problem storage system (1008) in order to achieve the select target version of software and/or firmware. The determined upgrades may then be packaged into the system update (1022).

The method of FIG. 10 further includes applying (1020) the system update (1022) to the selected problem storage system (1008). Applying (1020) the system update (1022) to the selected problem storage system (1008) may be carried out by remotely updating the storage system without intervention by the organization. Remotely updating the storage system without intervention by the organization may include sending the system update (1022) to a storage location at or associated with the problem storage system (1008) for staging. Once the system update (1022) is ready for application to the problem storage system (1008), the IOPs on the problem storage system (1008) may be halted and the system update (1022) may then be applied. Once the problem storage system (1008) has been upgraded using the system update (1022), then normal operation on the problem storage system (1008) may resume.

Figure 11:
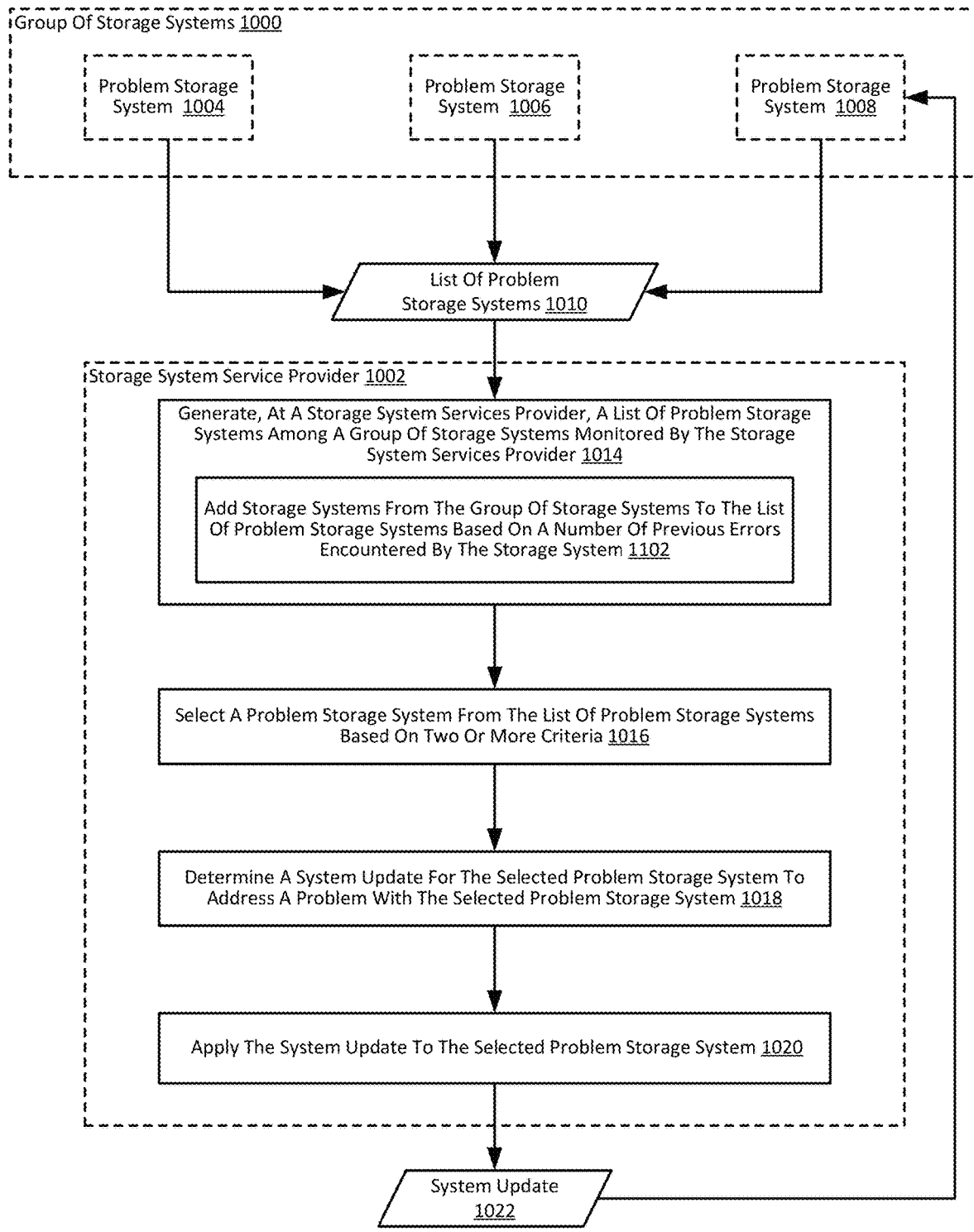
FIG. 11 sets forth a flow chart illustrating an example method for proactively optimizing a storage system according to embodiments of the present disclosure.

For further explanation, FIG. 11 sets forth a flow chart illustrating an additional example method for proactively optimizing a storage system according to embodiments of the present disclosure. The example method depicted in FIG. 11 is similar to the example method depicted in FIG. 10, as the example method depicted in FIG. 11 also includes generating (1014), at a storage system services provider (1002), a list of problem storage systems (1010) among a group of storage systems (1000) monitored by the storage system services provider (1002); selecting (1016) a problem storage system (1008) from the list of problem storage systems (1010) based on two or more criteria; determining (1018) a system update (1022) for the selected problem storage system (1008) to address a problem with the selected problem storage system (1008); and applying (1020) the system update (1022) to the selected problem storage system (1008).

The method of FIG. 11 differs from the method of FIG. 10, however, in that generating (1014), at a storage system services provider (1002), a list of problem storage systems (1010) among a group of storage systems (1000) monitored by the storage system services provider (1002) includes adding (1102) storage systems from the group of storage systems (1000) to the list of problem storage systems (1010) based on a number of previous errors encountered by the storage system. Adding (1102) storage systems from the group of storage systems (1000) to the list of problem storage systems (1010) based on a number of previous errors encountered by the storage system may be carried out by the storage system service provider (1002) adding to, sorting, or filtering the list of problem storage systems (1010) to determine the problem storage systems (1004, 1006, 1008) with the greatest number of previously reported errors. The determination may include only those problems storage systems (1004, 1006, 1008) that match other criteria.

Generating (1014), at a storage system services provider (1002), a list of problem storage systems (1010) among a group of storage systems (1000) monitored by the storage system services provider (1002) may also include determining a severity of previous errors reported for each problem storage system in the list of problem storage systems. Determining a severity of previous errors reported for each problem storage system in the list of problem storage systems may be carried out by the storage system service provider (1002) evaluating the reported errors and assigning a severity level to the error and/or the problem storage systems (1004, 1006, 1008). A particular combination of previously reported errors may indicate to the storage system service provider (1002) that a more severe error has occurred on the problem storage system (1004, 1006, 1008), and may assign that severity to the problem storage system (1004, 1006, 1008) or to each associated error report. The particular combination of reported errors may match a known pattern that indicates the occurrence of an error that may range from low to high or critical.

Figure 12:
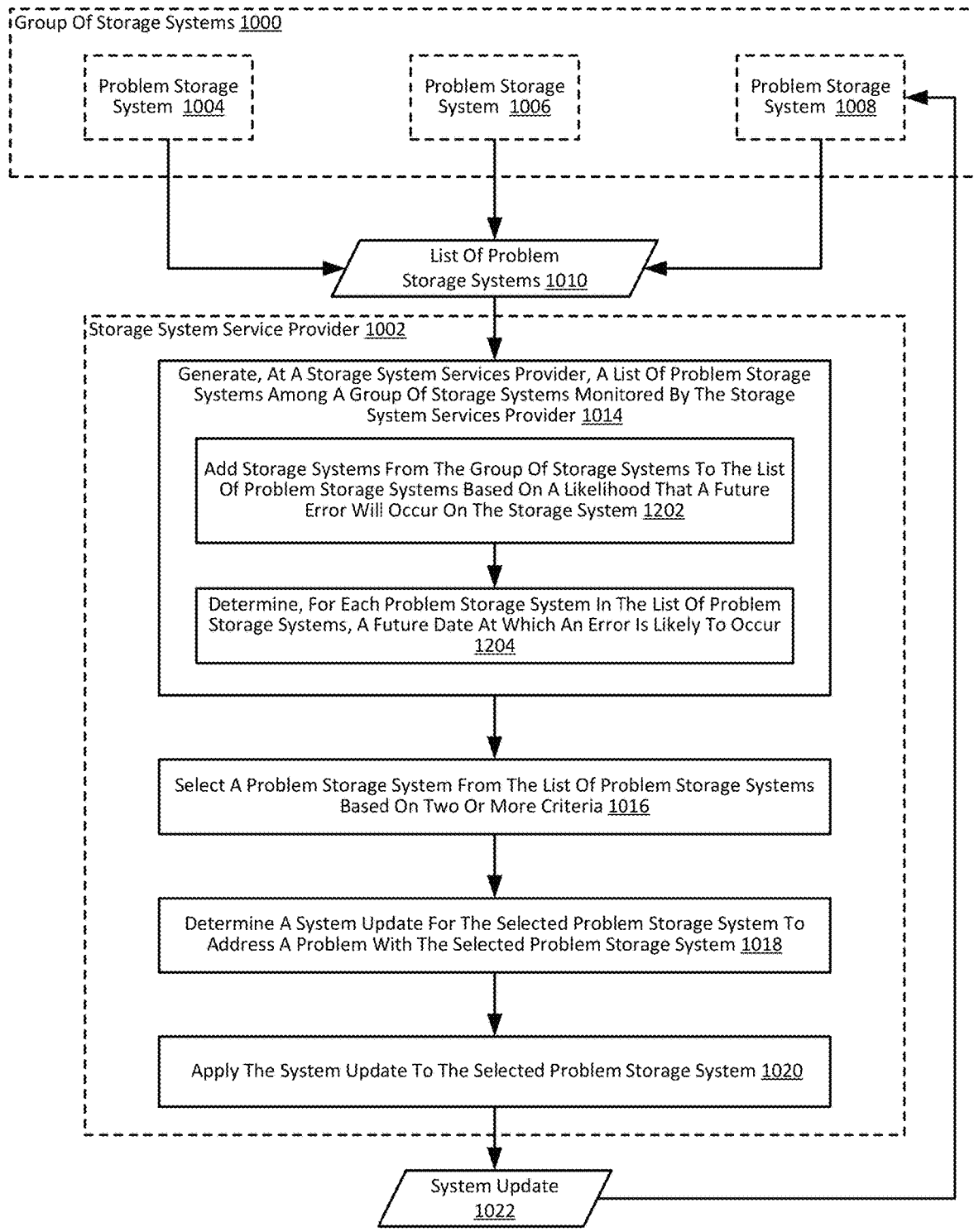
FIG. 12 sets forth a flow chart illustrating an example method for proactively optimizing a storage system according to embodiments of the present disclosure.

For further explanation, FIG. 12 sets forth a flow chart illustrating an additional example method for proactively optimizing a storage system according to embodiments of the present disclosure. The example method depicted in FIG. 12 is similar to the example method depicted in FIG. 10, as the example method depicted in FIG. 12 also includes generating (1014), at a storage system services provider (1002), a list of problem storage systems (1010) among a group of storage systems (1000) monitored by the storage system services provider (1002); selecting (1016) a problem storage system (1008) from the list of problem storage systems (1010) based on two or more criteria; determining (1018) a system update (1022) for the selected problem storage system (1008) to address a problem with the selected problem storage system (1008); and applying (1020) the system update (1022) to the selected problem storage system (1008).

The method of FIG. 12 differs from the method of FIG. 10, however, in that generating (1014), at a storage system services provider (1002), a list of problem storage systems (1010) among a group of storage systems (1000) monitored by the storage system services provider (1002) includes adding (1202) storage systems from the group of storage systems (1000) to the list of problem storage systems (1010) based on a likelihood that a future error will occur on the storage system; and determining (1204), for each problem storage system in the list of problem storage systems (1010), a future date at which an error is likely to occur.

Adding (1202) storage systems from the group of storage systems (1000) to the list of problem storage systems (1010) based on a likelihood that a future error will occur on the storage system may be carried out by the storage system service provider (1002) adding to, sorting, or filtering the list of problem storage systems (1010) to determine the problem storage systems (1004, 1006, 1008) with a particular combination of error reports that indicate a likelihood that a future error will occur. Each of the error reports in the particular combination may, themselves, not be severe. However, the particular combination of error reports may indicate that the more severe error is likely to occur in the future.

Generating (1014), at a storage system services provider (1002), a list of problem storage systems (1010) among a group of storage systems (1000) monitored by the storage system services provider (1002) may also include determining a severity of the predicted future errors reported for each problem storage system in the list of problem storage systems. Determining a severity of the predicted future errors reported for each problem storage system in the list of problem storage systems may be carried out by the storage system services provider (1002) evaluating the particular combination of reported errors that indicate a likely future error. The particular combination of reported errors may match a known pattern that predicts the future occurrence of an error that may range from low to high or critical.

Determining (1204), for each problem storage system in the list of problem storage systems (1010), a future date at which an error is likely to occur may be carried out by the storage system services provider (1002) evaluating each error report previously received associated with the problem storage system (1008) along with a timeline of the reported errors. By comparing the reported errors and timeline to a known pattern of reported errors and timeline, the storage system services provider (1002) may predict an estimated date by which the problem storage system (1008) will likely begin to experience high level or critical errors.

Figure 13:
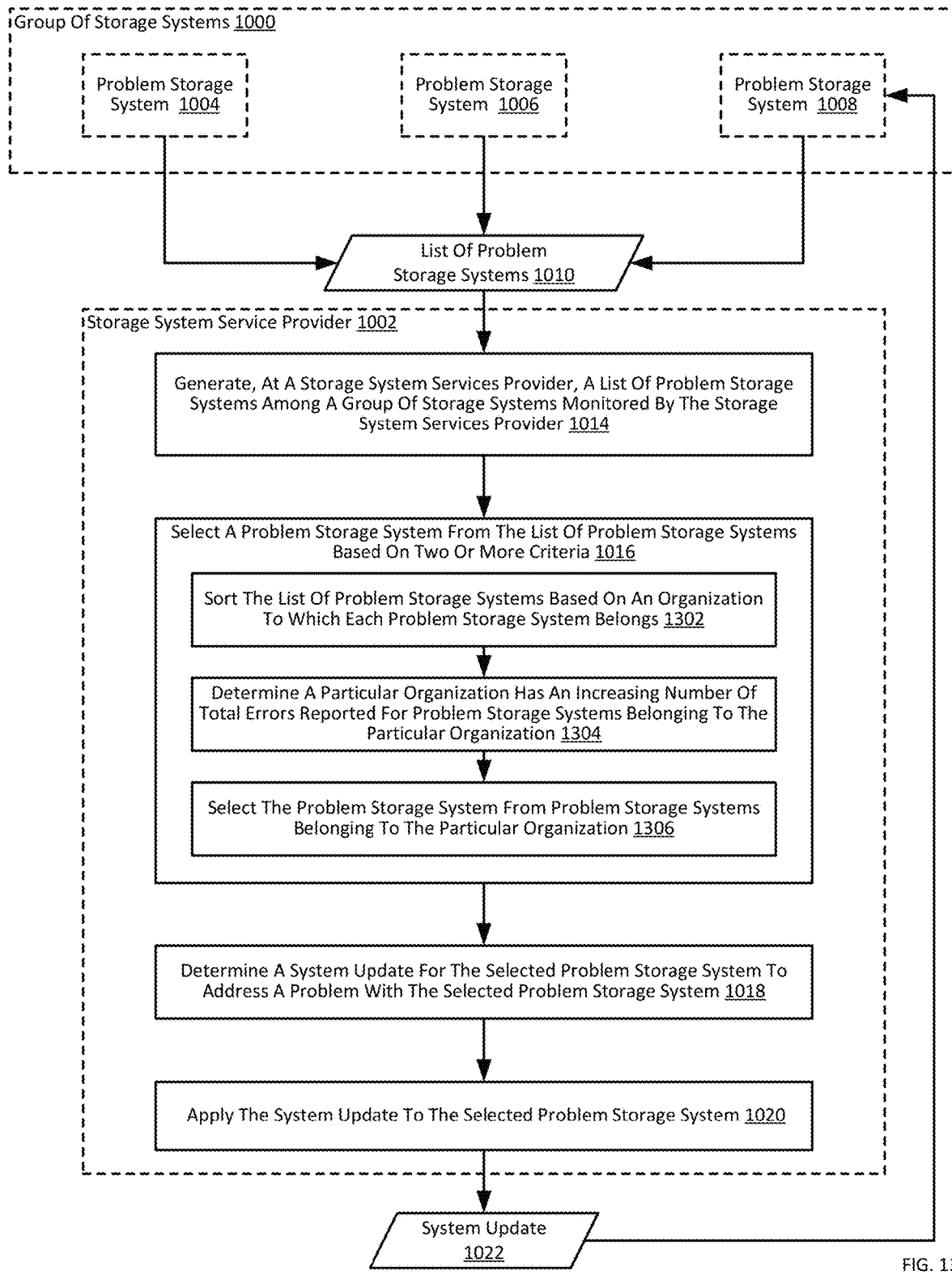
FIG. 13 sets forth a flow chart illustrating an example method for proactively optimizing a storage system according to embodiments of the present disclosure.

For further explanation, FIG. 13 sets forth a flow chart illustrating an additional example method for proactively optimizing a storage system according to embodiments of the present disclosure. The example method depicted in FIG. 13 is similar to the example method depicted in FIG. 10, as the example method depicted in FIG. 13 also includes generating (1014), at a storage system services provider (1002), a list of problem storage systems (1010) among a group of storage systems (1000) monitored by the storage system services provider (1002); selecting (1016) a problem storage system (1008) from the list of problem storage systems (1010) based on two or more criteria; determining (1018) a system update (1022) for the selected problem storage system (1008) to address a problem with the selected problem storage system (1008); and applying (1020) the system update (1022) to the selected problem storage system (1008).

The method of FIG. 13 differs from the method of FIG. 10, however, in that selecting (1016) a problem storage system (1008) from the list of problem storage systems (1010) based on two or more criteria includes sorting (1302) the list of problem storage systems (1010) based on an organization to which each problem storage system belongs; determining (1304) a particular organization has an increasing number of total errors reported for problem storage systems belonging to the particular organization; and selecting (1306) the problem storage system (1008) from problem storage systems belonging to the particular organization.

Sorting (1302) the list of problem storage systems (1010) based on an organization to which each problem storage system belongs may be carried out by the storage system services provider (1002) collecting each error report for all problem storage systems belonging to a single organization. A total number of error reports for each organization may then be determined. The storage system services provider (1002) may further determine the total number of error reports of each severity, and whether those error reports indicate a current or future error based on a matched pattern (as discussed above). The storage system services provider (1002) may filter the list of problem storage systems (1010) by organizations experiencing at least a minimum number of error reports.

Determining (1304) a particular organization has an increasing number of total errors reported for problem storage systems belonging to the particular organization may be carried out by comparing the number of error reports for all problem storage systems for a single organization over one period of time to the number of error reports for the same organization over a second, subsequent and more recent period of time. If the organization has generated more error reports during the subsequent recent time period than the initial time period, then that organization is experiencing increasing error reports over the two time periods. If more than one organization is experiencing increasing error reports, then the storage system services provider (1002) may select the particular organization based on error reporting metrics, such as greatest increase or greatest volume of error reports.

Selecting (1306) the problem storage system (1008) from problem storage systems belonging to the particular organization may be carried out by the storage system services provider (1002) selecting the problem storage system (1008) belonging to the particular organization that is experiencing the greatest increase in error reports or, alternatively, the problem storage system (1008) experiencing the greatest volume of error reports. A selection policy may be used to select the problem storage system (1008) from all problem storage systems belonging to the particular organization. For example, the storage system services provider (1002) may select the problem storage system (1008) with the most resolvable issue based on the pattern of error reports, thereby having a greater impact to the total number of error reports by the particular organization.

Other manipulations of the list of problem storage systems (1010) may be performed to prioritize a specific problem storage system or group of problem storage systems within a single organization or across multiple organizations. For example, the list of problem storage systems (1010) may be data mined for reports of problems over a time period, filtering out minor issues, to create a time-series list of issues by organization. Each error report may be weighted according to variables such as severity and duration of outage. Those weighted error reports may then be scaled over a selected time period to diminish error reports that occurred at the beginning of the period and emphasize more recent error reports. The weighted error reports are then summed by organization and sorted to create a ranked list of organizations experiencing the greatest amount of weighted error reports over the selected time period. The entire process is run a second time for the time period less one week. By comparing the first and second results, a rank adjustment delta may be calculated that indicates whether an organization is greater or fewer problems in the most recent week.

Each step described above may be carried out automatically and without user intervention.

Advantages and features of the present disclosure can be further described by the following statements:

1. A method of proactively optimizing a storage system comprising generating, at a storage system services provider, a list of problem storage systems among a group of storage systems monitored by the storage system services provider; selecting a problem storage system from the list of problem storage systems based on two or more criteria; determining a system update for the selected problem storage system to address a problem with the selected problem storage system; and applying the system update to the selected problem storage system.

2. The method of statement 1 wherein generating, at the storage system services provider, the list of problem storage systems among the group of storage systems monitored by the storage system services provider comprises adding storage systems from the group of storage systems to the list of problem storage systems based on a number of previous errors encountered by the storage system.

3. The method of statement 2 or statement 1 wherein generating, at the storage system services provider, the list of problem storage systems among the group of storage systems monitored by the storage system services provider comprises adding storage systems from the group of storage systems to the list of problem storage systems based on a likelihood that a future error will occur on the storage system.

4. The method of statement 3, statement 2, or statement 1 wherein generating, at the storage system services provider, the list of problem storage systems among the group of storage systems monitored by the storage system services provider further comprises determining, for each problem storage system in the list of problem storage systems, a future date at which an error is likely to occur.

5. The method of statement 4, statement 3, statement 2, or statement 1 wherein selecting the problem storage system from the list of problem storage systems based on two or more criteria comprises: sorting the list of problem storage systems based on an organization to which each problem storage system belongs; determining a particular organization has an increasing number of total errors reported for problem storage systems belonging to the particular organization; and selecting the problem storage system from problem storage systems belonging to the particular organization.

6. The method of statement 5, statement 4, statement 3, statement 2, or statement 1 wherein generating, at the storage system services provider, the list of problem storage systems among the group of storage systems monitored by the storage system services provider comprises determining a severity of errors reported for each problem storage system in the list of problem storage systems.

7. The method of statement 6, statement 5, statement 4, statement 3, statement 2, or statement 1 wherein applying the system update to the selected problem storage system comprises remotely updating the storage system without intervention by the organization.

Readers will appreciate that according to embodiments of the present disclosure, recommended actions may be automatically applied through the use of one or more interfaces that are available to the user. For example, a user clicking on the multi-selection element (936) may cause a dialog box to open, where the dialog box prompts the user to specify whether they would like to have all recommended actions applied automatically in the future. Likewise, a user clicking on a particular selection element (924, 926, 928, 930, 932, 934) may cause a dialog box to open, where the dialog box prompts the user to specify whether they would like to have all recommended actions that are of the same type as the recommended action that will be applied in response to the user clicking on the particular selection element (924, 926, 928, 930, 932, 934) applied automatically in the future. Readers will appreciate that other interfaces may exist that enable a user to have all recommended actions applied automatically in the future, to select the type of recommended actions that will be automatically applied in the future, and so on. Readers will appreciate that the GUI (902) depicted in FIG. 9 is included only as an example. In other embodiments, such a GUI may include different, additional, or fewer elements in accordance with embodiments of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of proactively optimizing a storage system comprising:
   generating, at a storage system services provider, a list of problem storage systems among a group of storage systems monitored by the storage system services provider;
   selecting a problem storage system from the list of problem storage systems based on two or more criteria;
   determining a system update for the selected problem storage system to address a problem with the selected problem storage system; and
   applying the system update to the selected problem storage system.

2. The method of claim 1, wherein generating, at the storage system services provider, the list of problem storage systems among the group of storage systems monitored by the storage system services provider comprises adding storage systems from the group of storage systems to the list of problem storage systems based on a number of previous errors encountered by the storage system.

3. The method of claim 1, wherein generating, at the storage system services provider, the list of problem storage systems among the group of storage systems monitored by the storage system services provider comprises adding storage systems from the group of storage systems to the list of problem storage systems based on a likelihood that a future error will occur on the storage system.

4. The method of claim 3, wherein generating, at the storage system services provider, the list of problem storage systems among the group of storage systems monitored by the storage system services provider further comprises determining, for each problem storage system in the list of problem storage systems, a future date at which an error is likely to occur.

5. The method of claim 1, wherein selecting the problem storage system from the list of problem storage systems based on two or more criteria comprises:
   sorting the list of problem storage systems based on an organization to which each problem storage system belongs;
   determining a particular organization has an increasing number of total errors reported for problem storage systems belonging to the particular organization; and
   selecting the problem storage system from problem storage systems belonging to the particular organization.

6. The method of claim 1, wherein generating, at the storage system services provider, the list of problem storage systems among the group of storage systems monitored by the storage system services provider comprises determining a severity of errors reported for each problem storage system in the list of problem storage systems.

7. The method of claim 1, wherein applying the system update to the selected problem storage system comprises remotely updating the storage system without intervention by the organization.

8. An apparatus for proactively optimizing a storage system, the apparatus comprising a computer processor, a computer memory operatively coupled to the computer processor, the computer memory having disposed within it computer program instructions that, when executed by the computer processor, cause the apparatus to carry out the steps of:
   generating, at a storage system services provider, a list of problem storage systems among a group of storage systems monitored by the storage system services provider;
   selecting a problem storage system from the list of problem storage systems based on two or more criteria;
   determining a system update for the selected problem storage system to address a problem with the selected problem storage system; and
   applying the system update to the selected problem storage system.

9. The apparatus of claim 8, wherein generating, at the storage system services provider, the list of problem storage systems among the group of storage systems monitored by the storage system services provider comprises adding storage systems from the group of storage systems to the list of problem storage systems based on a number of previous errors encountered by the storage system.

10. The apparatus of claim 8, wherein generating, at the storage system services provider, the list of problem storage systems among the group of storage systems monitored by the storage system services provider comprises adding storage systems from the group of storage systems to the list of problem storage systems based on a likelihood that a future error will occur on the storage system.

11. The apparatus of claim 10, wherein generating, at the storage system services provider, the list of problem storage systems among the group of storage systems monitored by the storage system services provider further comprises determining, for each problem storage system in the list of problem storage systems, a future date at which an error is likely to occur.

12. The apparatus of claim 8, wherein selecting the problem storage system from the list of problem storage systems based on two or more criteria comprises:
   sorting the list of problem storage systems based on an organization to which each problem storage system belongs;
   determining a particular organization has an increasing number of total errors reported for problem storage systems belonging to the particular organization; and
   selecting the problem storage system from problem storage systems belonging to the particular organization.

13. The apparatus of claim 8, wherein generating, at the storage system services provider, the list of problem storage systems among the group of storage systems monitored by the storage system services provider comprises determining a severity of errors reported for each problem storage system in the list of problem storage systems.

14. The apparatus of claim 8, wherein applying the system update to the selected problem storage system comprises remotely updating the storage system without intervention by the organization.

15. A computer program product for proactively optimizing a storage system, the computer program product disposed upon non-transitory computer-readable media, the computer program product comprising computer program instructions that, when executed, cause a computer to carry out the steps of:
   generating, at a storage system services provider, a list of problem storage systems among a group of storage systems monitored by the storage system services provider;
   selecting a problem storage system from the list of problem storage systems based on two or more criteria;
   determining a system update for the selected problem storage system to address a problem with the selected problem storage system; and
   applying the system update to the selected problem storage system.

16. The computer program product of claim 15, wherein generating, at the storage system services provider, the list of problem storage systems among the group of storage systems monitored by the storage system services provider comprises adding storage systems from the group of storage systems to the list of problem storage systems based on a number of previous errors encountered by the storage system.

17. The computer program product of claim 15, wherein generating, at the storage system services provider, the list of problem storage systems among the group of storage systems monitored by the storage system services provider comprises adding storage systems from the group of storage systems to the list of problem storage systems based on a likelihood that a future error will occur on the storage system.

18. The computer program product of claim 17, wherein generating, at the storage system services provider, the list of problem storage systems among the group of storage systems monitored by the storage system services provider further comprises determining, for each problem storage system in the list of problem storage systems, a future date at which an error is likely to occur.

19. The computer program product of claim 15, wherein selecting the problem storage system from the list of problem storage systems based on two or more criteria comprises:
   sorting the list of problem storage systems based on an organization to which each problem storage system belongs;
   determining a particular organization has an increasing number of total errors reported for problem storage systems belonging to the particular organization; and
   selecting the problem storage system from problem storage systems belonging to the particular organization.

20. The computer program product of claim 15, wherein generating, at the storage system services provider, the list of problem storage systems among the group of storage systems monitored by the storage system services provider comprises determining a severity of errors reported for each problem storage system in the list of problem storage systems.

* * * * *